Jan. 18, 1966    H. BROOKS ET AL    3,229,657
ECHO RANGING TORPEDO
Filed Aug. 20, 1952    13 Sheets-Sheet 1

INVENTORS
H. BROOKS
A. BUTZ JR.
BY
ATTYS.

INVENTORS
H. BROOKS
A. BUTZ JR.

Jan. 18, 1966  H. BROOKS ET AL  3,229,657
ECHO RANGING TORPEDO
Filed Aug. 20, 1952  13 Sheets-Sheet 6

INVENTORS
H. BROOKS
A. BUTZ JR.
BY
ATTYS.

INVENTORS
H. BROOKS
A. BUTZ JR.
BY
ATTYS.

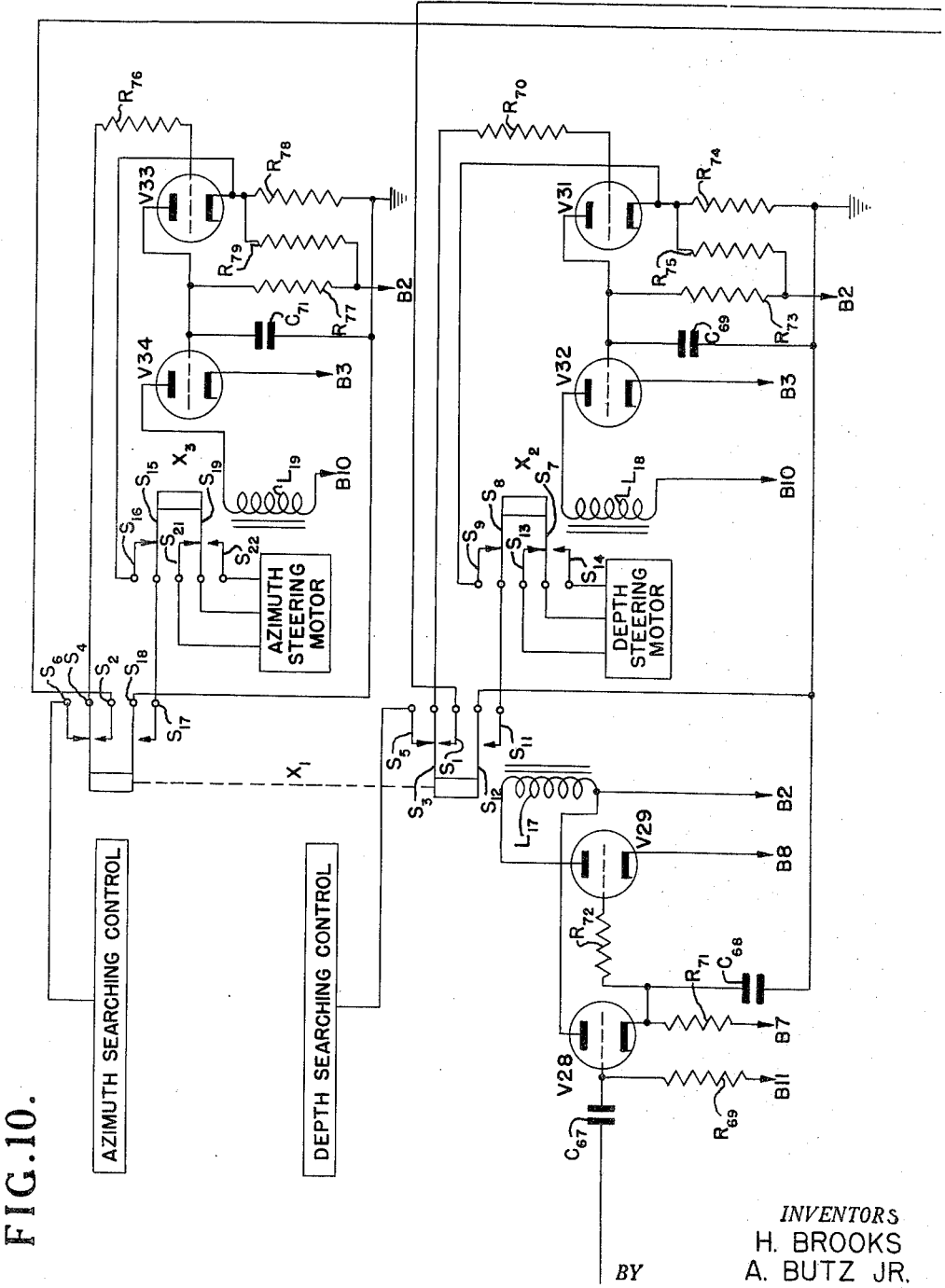

INVENTORS
H. BROOKS
A. BUTZ JR.
BY
ATTYS.

Jan. 18, 1966   H. BROOKS ET AL   3,229,657
ECHO RANGING TORPEDO
Filed Aug. 20, 1952   13 Sheets-Sheet 12
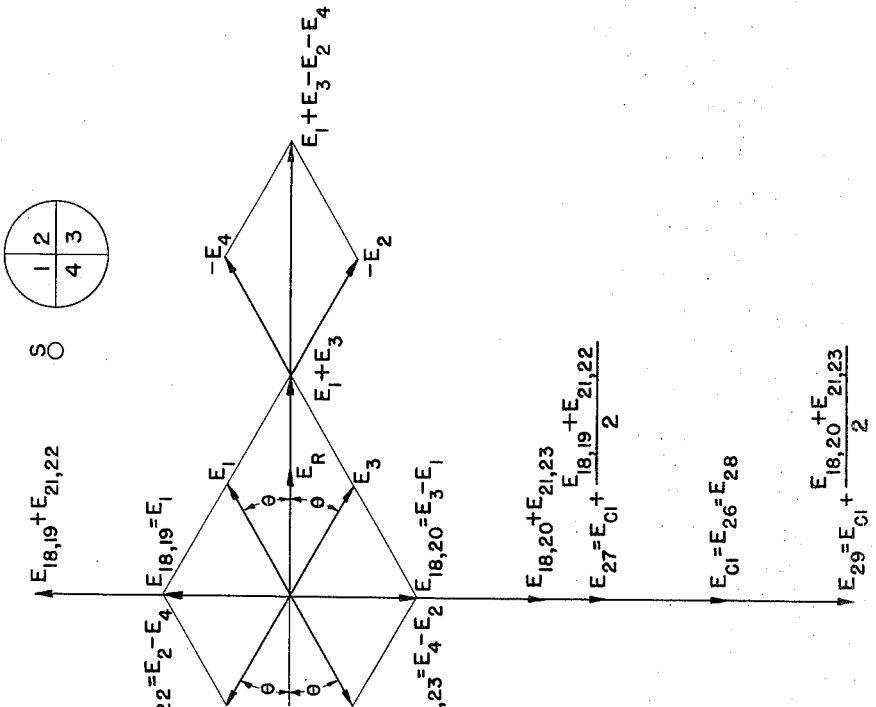
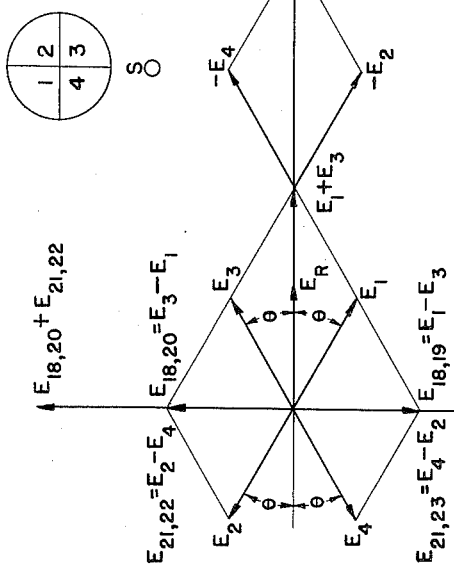
INVENTORS
H. BROOKS
A. BUTZ JR.
BY
ATTYS.

Jan. 18, 1966    H. BROOKS ET AL    3,229,657
ECHO RANGING TORPEDO
Filed Aug. 20, 1952    13 Sheets-Sheet 13

| FIG. 7. | FIG. 8. | FIG. 9. | FIG. 10. |
|---------|---------|---------|----------|
| FIG. 3. | FIG. 4. | FIG. 5. | FIG. 6.  |

INVENTORS
H. BROOKS
A. BUTZ JR.
BY
ATTYS.

United States Patent Office 3,229,657
Patented Jan. 18, 1966

3,229,657
ECHO RANGING TORPEDO
Harvey Brooks, Cambridge, Mass., and Arthur N. Butz, Jr., deceased, late of State College, Pa., by Arthur N. Butz, Sr., administrator, Maplewood, N.J., assignors to the United States of America as represented by the Secretary of the Navy
Filed Aug. 20, 1952, Ser. No. 305,432
20 Claims. (Cl. 114—23)

This invention relates generally to an echo ranging system and more particularly pertains to an acoustically steered mechanism which is actuated in accordance with the direction of incidence of an echo from a target which is moving relative to the mechanism and the surrounding medium, the present invention being a continuation-in-part of the copending application of Harvey Brooks for Echo Steering Torpedo, Serial No. 240,213, filed August 3, 1951, now Patent No. 3,042,755.

In the prior art homing devices it has been well known to provide acoutsic responsive devices which would receive noise from the propellers or other sound sources on a target and utilize this received energy to orient the path of travel of the device in the direction from which the sound is received. Such devices have not been completely satisfactory in that they are susceptible to extraneous sounds such as decoy action and experience difficulty in homing on a quiet target such as a slowly moving submarine.

The present invention overcomes these disadvantages of prior art devices by providing an echo ranging type homing device which detects the presence of an object by echo ranging means. In the echo ranging system of the present invention, pulses of high frequency energy are transmitted to the surrounding medium, such as a body of water, by an electro-mechanical transducer at spaced transmission times separated by listening intervals. During the listening intervals, the acoustic energy incident on the transducer comprises reverberation from the surrounding medium and echoes from the target, the former of a predominant frequency differing from the transmission frequency by an amount dependent on the speed of the device and hereinafter referred to as own Doppler; the latter of a frequency differing from the frequency of reverberation by an amount dependent on the speed of the target and hereinafter referred to as target Doppler.

The input circuits of the present invention, described and claimed in the copending application of Harvey Brooks for Balanced Input Circuits, Serial No. 263,807, filed December 28, 1951, now Patent No. 3,025,493 permit the use of a single quadrantally split transducer for transmission of acoustic signals and for reception of the reverberation signals and target echoes produced thereby, the circuit arrangement being such that constant electrical connection is maintained between the transducer and the transmitter, and between the same transducer and the receiver, without excessive energy loss in the receiver during transmission, and without excessive energy loss in the transmitter during reception. In transmission, the quadrantal elements in the transducer are energized so that all elements vibrate in phase and transmit a directional acoustic signal to the surrounding medium, and during reception the incoming signals due to reverberation and target echoes generate voltages in each of the quadrantal elements. The voltage outputs of all quadrantal elements are vectorially combined in the input circuits to produce a pilot signal or reference voltage, the amplitude and frequency of which is correlative with the intensity and frequency of the acoustic energy. Due to the quadrantal elements due to target echoes will have relative phase relations correlative with the direction of incidence of target echoes, the input circuits of the present invention effectuating the production of two pairs of steering lobes in accordance with the quadrantal transducer voltages, for the operation of two pairs of relatively perpendicular sets of control surfaces on the torpedo, whereby the latter is under full acoustic control and the trajectory of the torpedo is unaffected by roll thereof. This permits the torpedo to attack at high climb and dive angles, since the roll of the torpedo, due to inadequate torque compensation in such attitudes, does not affect the steering.

More specifically, the voltage outputs due to target echoes of each of the quadrantal elements of the transducer is phase shifted relative to the reference voltage in a direction and amplitude dependent on the angular deviation of the target from the transducer axis, the voltage ouput of each quadrantal element thus having a component in quadrature with the reference voltage and of an amplitude corresponding to the angular displacement of the target from the transducer axis. Provision is made in the input circuits of the present invention for obtaining the algebraic differences between the voltages appearing in diagonally opposite quadrants, to produce pairs of oppositely phase intermediate voltages proportional to the sum of the quadrature voltages induced in diagonally opposite quadrants, the sense of which opposedly phased voltages is determined by the orientation of a target relative to the transducer axis. Provision is further made for combining each of the opposedly phased intermediate voltages with a voltage proportional to the reference voltage, and which is in phase or in phase opposition with the intermediate voltages, depending on the sense of the latter, to produce four control voltages, the amplitude of each of which is dependent on the sense and amplitude of the intermediate voltage combined therewith. Each of the control voltages produced by one pair of diagonally opposite quadrants is combined with each of the control voltages produced by the other pair of diagonally opposite quadrants, to thereby effect a comparison of the phase shift between upper and lower halves of the transducer and produce up and down signals dependent on the sense of the phase shift, and also compare the phase shift between the right and left halves of the transducer and product right and left signals dependent on the sense of the phase difference therebetween. Thus, as the direction of incidence of sound is varied, the relative amplitudes of the up, down, right and left signals are varied, the comparison of which provides the basic information for the control system.

Since the steering intelligence is contained in the relative amplitudes of the output voltages from the input circuits, i.e., the up, down, right and left signals produced thereby, it is apparent that the relative amplitudies must be maintained during the amplification thereof, and for this purpose, and also to reduce the requisite number of tubes used, a common channel amplifier is provided to amplify all of the output signals. Additionally, the reference voltage is pased through a frequency converter, the output of which is also applied to the common channel amplifier, and amplified therein along with the aforementioned output voltages.

Amplification of the four output voltages in a single channel is effectuated by a quarature receiver amplifier which electronically commutates a common amplifier in time sequence to the four output voltages which have the same frequency, and which thereby produce a resultant voltage having amplitude and phase characteristics correlative with the output voltages. The output of the amplifier is applied to suitable phase-sensitive detectors which produce steering signals having amplitude and phase characteristics correlative with the relative intensity of the up, down, right and left voltages produced by the input circuits.

More specifically, the quadrature receiver employs circuits which amplitude modulate the four output voltages from the input circuit, which output voltages have the same frequency, by suitable phased voltages having a common frequency different from the signal frequency. The modulators are operated in such a manner that when the modulated voltages are combined, the amplitude and phase of the envelope of the resultant modulated voltage is a measure of the relative amplitudes of the four output voltages. The resultant modulated voltage is then amplified and passed through a demodulator, the output of which is proportional to the resultant envelope referred to above. The resultant envelope is applied to suitable phase-sensitive detectors which are synchronized with the modulators and rendered non-conducting during the proper portion of the cycle of the resultant envelope, by the hereinbefore mentioned phase modulating voltages, whereby the output of one of the phase sensitive detectors is proportional to the algebraic difference between one pair of output voltages, while the output of the other phase-sensitive detector is proportional to the algebraic difference between the other pair of output voltages.

The reference voltage, at reduced signal frequency, is separated at the output of the common channel amplifier and, as hereinbefore described, is utilized to control the amplification and the application of the output voltages to the steering mechanism. For this purpose, the reduced-frequency reference voltage is applied to an AVC circuit which operates in such a manner as to reduce the gain of the amplifier by an amount proportional to the intensity of the reverberation incident on the transducer, and thereby tends to maintain constant the amplitude of the amplifier output voltage, except during the reception of an echo, the magnitude of which is greater than the intensity of concurrent reverberation.

The present invention further provides for the control of the application of the steering signals to the steering mechanisms, in such a manner that only those echoes which have a predetermined intensity greater than the intensity of the concurrent reverberation and which persist for a predetermined time effectuate steering. For this purpose, the reference voltage, at reduced signal frequency, is also applied to an amplitude gate which has characteristics such that its output voltage is zero when the amplitude of the applied voltage is less than a predetermined value, and which has further characteristics such that its output voltage is an amplified replica of the applied voltage, when the amplitude of the applied voltage is greater than said predetermined value. The predetermined amplitude of the applied voltage required to actuate the amplitude gate is preferably selected through consideration of the characteristics of the automatic gain control circuit associated with the common amplifier, the value being selected such that signals which represent reverberation do not actuate the amplitude gate except during the reverberation sampling period, as more fully described hereinafter, but such that the signals having an amplitude slightly greater than the amplitude of concurrent reverberation do actuate the amplitude gate.

The output of the amplitude gate is applied to a frequency discriminator which provides an output voltage, the instantaneous value of which is proportional to the algebraic difference between the frequency of the applied voltage and the characteristic frequency of the discriminator, the output voltage being zero when the frequency of the applied voltage and the characteristic frequency are equal. In order to distinguish between echoes from moving targets, such as ships and the like, from the echoes of stationary targets such as the bed of the body of water, the circuits of the present invention provide for the production of an enabling pulse only when the echo frequency differs from the frequency of the concurrent reverberation by a predetermined amount. By comparing the echo frequency, with the frequency of concurrent reverberation, the Doppler due to the speed of the torpedo, which changes throughout the course of the torpedo, does not effect the production of the Doppler enabling pulse. In order to effectuate the comparison, the output of the frequency discriminator is applied to suitable circuits which vary the frequency applied to the hereinbefore mentioned frequency converter, for a period following each transmission pulse, which period is hereinafter referred to as the reverberation sampling period, the frequency applied to the converter being varied in such a manner that the reduced signal frequency of the reference voltage is made equal to the characteristic frequency of the discriminator, whereby the output of the latter is reduced to zero. The resultant effect of this action, known as own Doppler nullification, is to make the reverberation signal at reduced signal frequency equal to the characteristic frequency of the discriminator, regardless of variations of own Doppler resulting from variations of the speed of the torpedo.

After the reverberation sampling period, the output of the discriminator is applied to a Doppler gate, the characteristics of which are such that its output voltage is of zero magnitude if the discriminator voltage is less than a predetermined value, and that when the discriminator voltage exceeds that value, the output of the Doppler gate is a voltage which is correlative with the voltage provided by the discriminator. The output of the Doppler gate, hereinafter referred to as the Doppler enabling pulse, is applied by the common channel amplifier so as to permit the passage of steering signals therethrough only in response to the application of such a pulse. Thus, application of the output voltages to the steering control mechanism is effectuated only when a pulse having a predetermined frequency difference from the concurrent reverberation frequency, and having a predetermined amplitude and duration, is received. In this manner the torpedo is enabled to steer only on targets which are moving relative to the surrounding medium.

An object of this invention is to provide a new and improved echo steering system for a torpedo or similar device.

A further object of the invention is to provide an echo steering system for a torpedo or similar device in which two dimensional guidance is derived from an echo from a target which is in motion relative to the water or other medium in which the device operates.

A further object of this invention is to provide an echo steering system for a torpedo or similar device which is insensitive to noise or reverberation echoes from stationary objects.

Another object of this invention is to provide an echo steering system for a torpedo or similar device which, when placed in operation, systematically searches throughout a predetermined space for a moving target and which, having received an echo from such a target, interrupts its searching procedure and utilizes information contained in the initial and succeeding target echoes to direct its course in the direction of the target.

Another object of this invention is to provide a transmitting and receiving circuit for applying electrical energy to a tranducer during transmission, and for utilizing voltages due to target echoes induced in the transducer during reception to determine the orientation of the target relative to the transducer.

Another object of this invention is to provide a means for maintaining constant electrical connection between a transducer and a transmitter and between the same transducer and a receiver without causing excessive loss of energy in the receiver when transmitting, or causing excessive loss of energy in the transmitter when receiving.

Another object of this invention is to provide an input circuit which, when used in conjunction with a quadrantally split transducer, provides simultaneous comparisons of the phase difference between the sum of the voltages generated in any two adjacent quadrants, and the sum of the voltages generated in the remaining quadrants.

Another object of this invention is to provide an input circuit which is particularly adapted for use with low impedance transducers by combining, in a single step, the step up transformation to grid impedance and the production of steering lobes by means of phase shift.

Another object of this invention is to provide an input circuit for an echo ranging system of a type which distinguishes between echoes from moving targets and echoes from stationary targets by the difference in Doppler frequency therebetween, which input circuit provides a reference voltage of a frequency equal to the mean frequency of reverberation from the surrounding medium, and of an amplitude correlative with the intensity thereof.

Another object of this invention is to provide an input circuit which produces four cophased output voltages having amplitude characteristics correlative with the phase difference between the voltages induced in the quadrantal elements of the transducer, together with a common channel amplifier for the cophased voltages, to thereby preserve the steering intelligence carried in the relative amplitudes thereof.

Another object of this invention is to provide a receiver amplifier system for modulating each of a plurality of applied output voltages with phased locally generated modulating voltages, and for combining the modulated voltages in such a manner that the phase and amplitude of the resultant modulation envelope is correlative with the relative amplitudes of the applied voltages, thereby effectuating electronic commutation of the applied voltages.

Another object of this invention is to provide a detector system including electronic switches, the phasing of which is tied in with the phasing of the modulating voltages so as to be rendered non-conducting during the proper portion of the switching cycle to effectuate a transformation of the phase and amplitude of the resultant envelope into voltages having magnitude and polarity correlative with the voltages applied to the modulators.

Another object of this invention is to provide a device for detecting the resultant modulation envelope and for obtaining the time integral thereof during that portion of the switching cycle in which the time integral of the envelope components due to certain of the applied voltages produces a steering signal having amplitude and phase characteristics correlative with the vector difference between those voltages, and the time integral of the envelope components due to the other applied voltages is zero.

Another object of this invention is to provide an echo ranging type steering system in which steering is enabled only in response to an echo signal having a predetermined frequency difference from the frequency of the concurrent reverberation; a predetermined level above the level of concurrent reverberation; and a persistency greater than a predetermined minimum length of time.

Another object of this invention is to provide an echo ranging system having input circuits which permit constant electrical connection between the transducer and a receiver, and the same transducer and a transmitter, without excessive loss of energy in the receiver during transmission, or excessive energy loss in the transmitter during reception, which receiver amplifies all of the applied voltages in a common channel and which common receiver amplifier is rendered inoperative during transmission, to prevent operation of a steering mechanism in response to transmission pulses.

Another object of this invention is to provide a receiver amplifier system in which the gain of the amplifier for the cophased output voltages is varied in accordance with the average intensity of the acoustic signals incident on the transducer, whereby short period echo signals are amplified in the amplifier, without appreciable reduction in the gain thereof and the slowly varying reverberation signals are suppressed.

Another object of this invention is to provide an amplitude gate for an echo ranging type homing device, which will enable application of steering signals to the steering mechanism by an amplitude enabling pulse only when the amplitude of the short period signals exceeds the level of the concurrent reverberation by a predetermined amount, and the duration of the short period signals exceeds a predetermined minimum length of time, thereby improving the immunity of the echo ranging system to spurious signals.

Another object of this invention is to provide a Doppler gate for an echo ranging system of the type which transmits pulses of high frequency energy at spaced transmission times separated by listening intervals, which gate detects the frequency of the incident acoustic energy during the reverberation sampling period following each transmission pulse, and effectuates comparison of the frequency of the echo signals and the frequency of the concurrent reverberation, and produces a Doppler enabling pulse when a predetermined frequency differential exists therebetween.

Another object of this invention is to provide a Doppler gate for an echo ranging type homing torpedo, which gate employs a frequency discriminator having a characteristic center frequency, and which produces voltages having amplitude and polarity correlative with the sense of the differential between the applied frequency and the characteristic frequency of the discriminator, together with circuits for correcting the frequency of the applied signal, to render the frequency of the applied signal, which is derived from the reverberation signals detected during the reverberation sampling period, equal to the characteristic frequency of the discriminator, thereby nulling the Doppler due to the speed of the torpedo.

Yet another object of this invention is to provide a system for disabling the torpedo Doppler nulling circuit when the target echo signals are received during the reverberation sampling period, as results when the torpedo comes within a predetermined range of proximity to the target, thereby preventing correction of the nullification circuit on the target echo frequency.

Other objects and many of the attendant advantages of this invention will be readily appreciated as the same becomes better understood by reference to the following detailed description when considered in connection with the accompanying drawings wherein:

FIG. 10 is a schematic diagram of the torpedo steering circuits;

FIGS. 11, 12, 13, 14 and 15 are vector diagrams indicating the relation between the position of the target relative to the transducer axis and the voltages produced; and FIG. 16 is a view showing the arrangements of FIGS. 3, 4, 5, 6, 7, 8, 9 and 10 to obtain a complete schematic diagram of the system.

Figure 1:
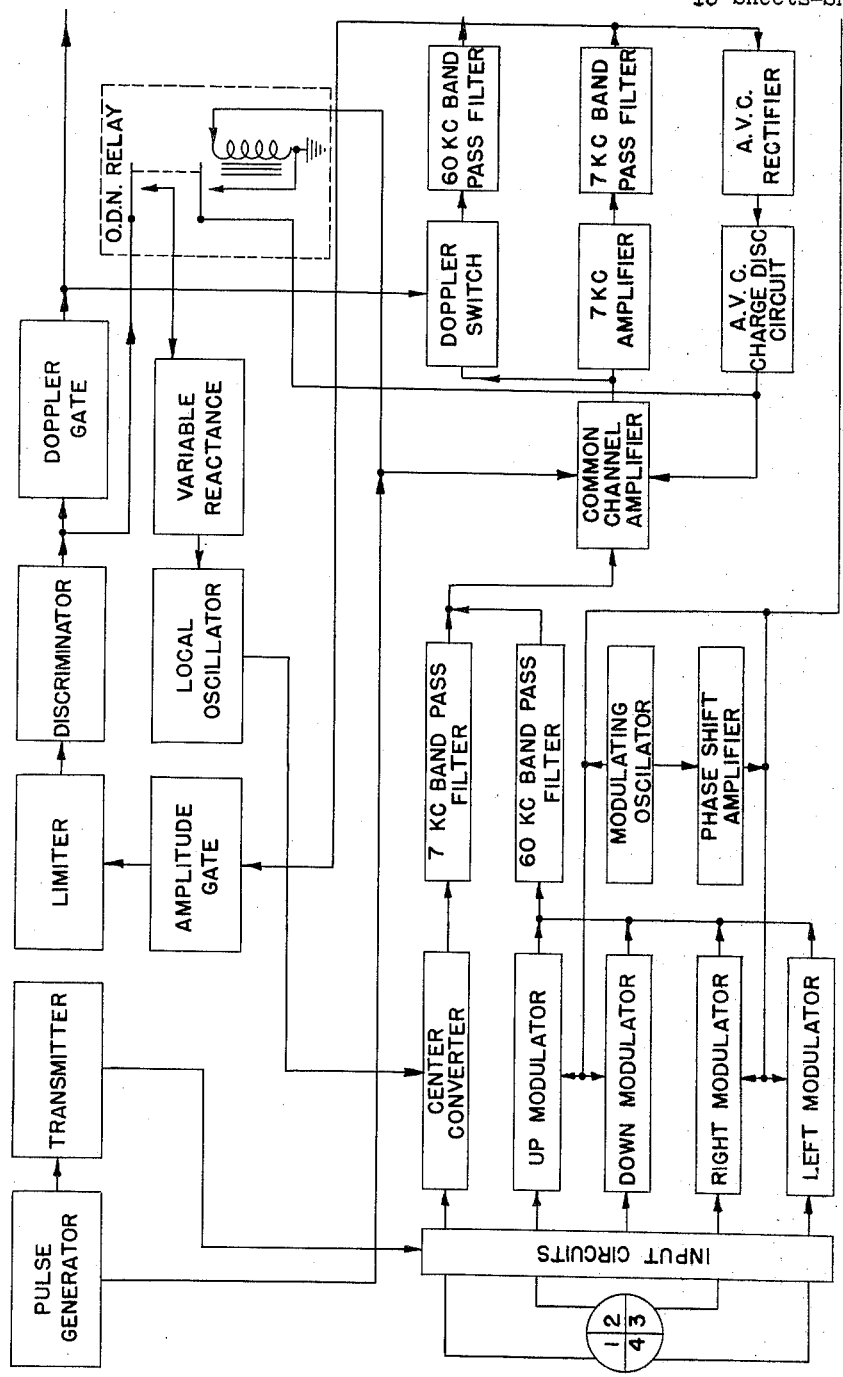
FIG. 1 is a block diagram of a portion of the echo ranging system including the transducer, inputs circuits, Doppler enablement channel and a portion of the quadrature receiver amplifier.
Figure 2:
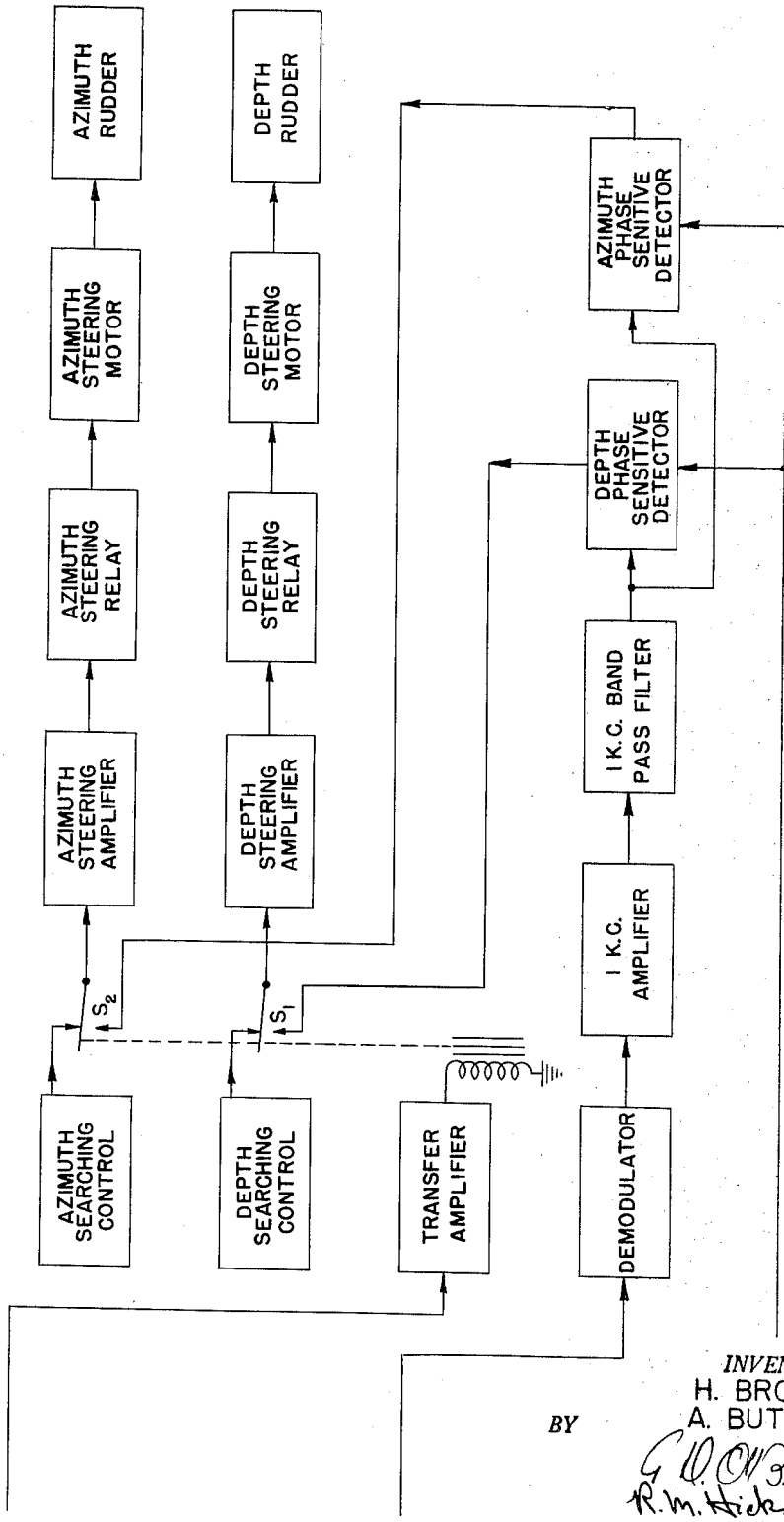
FIG. 2 is a block diagram of a second portion of the echo ranging circuit including the steering system and phase-sensitive detectors.

Referring now to the drawings, the invention will be described with reference to FIGS. 1 and 2. The circuits described are incorporated within a suitable self-propelled body such, for example, as a torpedo together with an explosive charge which may be detonated by suitable contact or by influence with the target and which may be launched into the water when the presence of a target submarine is suspected. The device may be launched from an airplane or, if suitable hydrostatic controls and a limited upward aspect search pattern are provided to prevent homing on a surface target, it may be launched from a surface vessel. The operative voltages are applied to the circuits by suitable arming means and a search of the surrounding medium is initiated by the echo ranging system of the present invention.

A transmitter generates pulses of alternating current at a suitable transmission frequency such, for example, as 60 kc. The pulse repetition rate of the transmitter is controlled by pulses provided by a suitable pulse generator which, in addition, generates synchronized positive and negative pulses which are applied to other elements of the acoustic control system in a manner hereinafter described. Pulses of alternating current generated by the transmitter are applied to input circuits and thence to an electro-acoustic transducer T, so that pulses of acoustic energy are radiated at predetermined intervals.

The time intervals separating transmissions are known as listening periods. During such listening periods acoustic energy incident upon the transducer comprises reverberation and echoes, the former of a predominant frequency differing from the transmission frequency by an amount which depends upon the speed of the torpedo and which amount is designated as own Doppler, and the latter of a frequency which differs from the predominant frequency of reverberation by an amount known as target Doppler. The amount of target Doppler deviation from the predominant frequency depends upon the speed and course of the reflecting object and which amount is zero for objects at rest. The predominant frequency of reverberation is herein designated as signal frequency.

The acoustic energy incident upon transducer T following transmission produces alternating voltages at the output terminals of the transducer, the frequencies of which are equal to the frequency of the incident energy. The phase and amplitude relations among these output voltages are a measure of the direction from which the incident energy arrives when applied to the input circuits which are arranged in the novel manner described and claimed in the copending application of Harvey Brooks for a Balanced Input Circuit for an Echo Ranging Receiver, Serial No. 263,807, filed December 28, 1951, now Patent No. 3,025,493 and described but not claimed per se in the instant application.

By means of the input circuits, five output voltages designated by right, left, up, down and center are produced. Each of these five voltages is of a frequency equal to the frequency of the energy incident upon the transducer and the arrangment of the input circuits is such that the amplitudes of the right, left, up and down voltages produced by an echo from a target are a measure of the target bearing in azimuth and depth. In particular, the algebraic difference between the amplitudes of the right and left voltages is a meausre of the target bearing in azimuth and the algebraic difference between the amplitudes of the up and down voltages is a measure of the target location in depth. The amplitude of the center voltage depends in part on the intensity of the energy incident upon the transducer. The right, left, up and down voltages are applied to four modulators which modulate these applied voltages by phased voltages of suitable frequency, such as 1 kc., which are provided by the modulating oscillator and amplifier. The output voltages provided by all of the modulators are combined, and the manner of operation of the modulators is such that the amplitude and phase of the modulation envelope of the combined output is a measure of the relative amplitudes of the right, left, up and down voltages. The means by which the modulating voltages are provided and are applied to the modulators and the output voltages obtained therefrom is preferably of a type described more fully hereinafter under the sub-heading of quadrature receiver amplifier.

The combined output of the modulators is applied to a 60 kc. band pass filter, the pass band of which includes the signal frequency plus and minus an amount equal to the maximum frequency deviation expected from traget Doppler plus the frequency of the modulating voltages.

The output of the 60 kc. band pass filter is applied to a common amplifier which is a broad band amplifier and which may be of conventional design.

Also applied to the common amplifier is a voltage derived from the center voltage by the action of a frequency converter. The circuits effecting frequency conversion employ a converter and a local oscillator of conventional design and frequency of, say, 53 kc. such that the frequency of the derived voltage is equal to the difference between the frequencies of the local oscillator voltage and the center voltage, while the amplitude of the derived voltage is proportional to the amplitude of the center voltage. The frequency of the derived voltage is herein called the reduced signal frequency and may be, for example, 7 kc. Moreover, the reduced signal frequency may be controlled by varying the frequency of the local oscillator through the use of a variable reactance tube and a frequency discriminator in a manner hereinafter described.

A 7 kc. band past filter interposed between the converter and the input to the common amplifier allows voltages at reduced signal frequency to pass, but attenuates voltages at other frequencies which also are present due to non-linear action of the converter.

The common amplifier preferably has its gain reduced to zero during those time intervals when the transmitter is applying energy to the transducer. Such gain reduction may be affected by application to one or more grids of the amplifier tubes of a blanking pulse provided by the pulse generator and synchronized with the pulses which are used to key the transmitter.

Also associated with the common amplifier are circuits which provide automatic control of gain in a manner designed to reduce the gain of the amplifier by an amount proportional to the intensity of the reverberation incident upon the transducer. Such automatic control of gain may be provided by an AVC rectifier and an AVC charge-discharge circuit. The automatic control of gain may, however, be of any type which tends to maintain constant the amplitude of those components of the common amplifier output voltage that are due to the incidence of reverberation on the transducer, and may alternatively be of a type in which the gain of the amplifier is varied according to a predetermined function of time which is inversely related to the amplitude of a typical reverberation signal. In this case gain control may be provided by a voltage developed in the pulse generator and applied to the amplifier by connections therebetween.

Regardless of the means by which automatic control of gain is provided, the gain control should not respond immediately to the initial blast of high intensity reverberation which immediately follows transmission, but should have a finite respond time during which the amplitude of the reverberation signal at the output of the common amplifier is much larger than the constant amplitude imposed by the gain control system during the remainder of the listening period. For this purpose, the AVC is disabled for a predetermined time interval following each transmission pulse by the ODN relay, to be described more fully hereinafter. The finite response time of the automatic gain control system is herein called the reverberation sampling time. The gain control after the reverberation sampling time should respond to the average value of the background level in the conventional manner in order that the short duration echo signals may be amplified, and not appreciably reduce the gain to prevent their appearance at the output of the amplifier.

The output of the common amplifier is applied to the inputs of a 7 kc. amplifier and a Doppler switch. The outputs of the 7 kc. amplifier and the Doppler switch are respectively applied to a 60 kc. band pass filter and a 7 kc. band pass filter. It will be appreciated at this point that the voltage at the output of the 7 kc. band pass filter is a voltage correlative with the center voltage from the input circuit at reduced signal frequency; that the amplitude of said voltage is substantially constant except during the reception of an echo, the intensity of which is greater than the intensity of concurrent reverberation, and except during the reverberation sampling time at which time the amplitude is very large.

The Doppler switch is designed to act both as an amplifier and an electronic switch; that is, its amplification is reduced to zero in the absence of a voltage pulse called the Doppler enabling pulse, but in the presence of a Doppler enabling pulse it functions as a conventional amplifier. Moreover, the operation of elements hereinafter described is such that a Doppler enabling pulse is applied to the Doppler switch only at such times as an echo is being received, and only in the event that the intensity of said echo is greater by a predetermined amount than the intensity of concurrent reverberation, and only in the event that the target Doppler characterizing such echo is greater than a predetermined amount, and only in the event that the duration of said echo is greater than a predetermined length of time.

It will be further appreciated due to the circuits for deriving the Doppler enabling pulse to be hereinafter described that the voltage appearing at the output of the 60 kc. band pass filter is zero except during the reception of an echo having all of the predetermined characteristics enumerated above; that during the reception of such an echo said voltage is a modulated signal, the modulation envelope of which is related as hereinbefore described in phase and amplitude to the direction from which the acoustic energy of the echo arrives at the transducer.

The output of the 60 kc. band pass filter is applied to a demodulator, the output of which is a voltage identical to the modulation envelope of the voltage applied to the demodulator.

The output of demodulator is applied to a 1 kc. amplifier, which may be an amplifier of conventional design, the output of which is applied to a 1 kc. band pass filter which is designed to pass voltages of a frequency equal to that of the modulating voltage developed by the modulating oscillator and amplifier, but which is designed to attenuate voltages of other frequencies.

The output of the 1 kc. band pass filter is applied to an azimuth phase-sensitive detector and to a depth phase-sensitive detector which phase-sensitive detectors are preferably of the type described more fully hereinafter under the quadrature receiver amplifier. To the azimuth and depth phase-sensitive detectors are also applied voltages which are provided by the modulating oscillator and amplifier and which are of the same frequency as the modulating voltages applied to modulators. The characteristics of the phase-sensitive detectors and the modulators are such that the output voltage of the depth phase-sensitive detector is proportional to the algebraic difference beween the amplitudes of the up and down voltages provided by the input circuits, and the output of the azimuth phase-sensitive detector is proportional to the algebraic difference between the amplitudes of the right and left voltages provided by the input circuits.

The output of the azimuth phase-sensitive detector is applied to a contact $S_2$ on the transfer relay and, provided this relay is energized, is applied to an azimuth steering amplifier the output of which actuates an azimuth steering relay.

The azimuth steering relay controls an azimuth steering motor or similar device for positioning the azimuth steering rudders of the torpedo. Moreover, the arrangement of the azimuth steering amplifier and azimuth steering relay is such that a voltage output of the azimuth phase-sensitve detector of short duration will cause the torpedo to turn in azimuth in a direction toward the target which produced this voltage and continue to turn in this direction, even after the voltage output of the azimuth phase-sensitive detector has disappeared, until such time as the azimuth phase-sensitive detector again provides an azimuth steering voltage.

The output of the depth phase-sensitive detector is applied to a contact $S_1$ on the transfer relay and, provided this relay is energized, is applied to a depth steering amplifier the output of which actuates a depth steering relay.

The depth steering relay controls a depth steering motor or similar device for positioning the depth steering rudders of the torpedo. The arrangement of the depth steering amplifier and the depth steering relay is such that a voltage output of the depth phase-sensitive detector of short duration will cause the torpedo to turn in depth in a direction toward the target which caused this voltage and continue to turn in this direction, even after the voltage ouput of the depth phase sensitive detector has disappeared, until such time as the depth phase senstive detector again provides a depth steering voltage.

It will be appreciated at this point that the output of the 1 kc. band pass filter differs from zero only during such times as an echo of predetermined characteristics is being received; that the output of the 1 kc. band pass filter is utilized to guide the torpedo in azimuth and depth in the direction from which an echo arrives; and that the output of the 1 kc. band pass filter is so used only in the event that the transfer relay is energized.

The output of the 7 kc. band pass filter is applied to an amplitude gate which is preferably of a type disclosed in the hereinafter described Doppler Discriminator Circuit, which has characteristics such that its output voltage is zero when the amplitude of the applied voltage is less than a predetermined value and which has further characteristics such that its output voltage is an amplified replica of the applied voltage when the amplitude of the applied voltage is greater than said predetermined value thereby actuating the gate. The predetermined amplitude of applied voltage required to actuate the amplitude gate is preferably selected through consideration of the characteristics of the automatic gain control circuits associated with the common amplifier.

Said predetermined value is preferably selected such that signals which represent reverberation do not actuate the amplitude gate except during the reverberation sampling period, but such that signals of amplitude slightly greater than the amplitude of concurrent reverberation do actuate the amplitude gate.

The output of the amplitude gate is applied to a limiter which is an amplifier having characteristics such that the maximum possible output voltage is produced when the voltage applied to the amplitude gate is just sufficient to make said amplitude gate conductive.

The output of the limiter is applied to a discriminator which may be of conventional design and which provides an output voltage the instantaneous value of which is proportional to the algebraic difference between the frequency of the applied voltage and the characteristics frequency of the circuits of the discriminator, said output voltage being zero when the two frequencies are equal.

The voltage output of the frequency discriminator is applied to other circuits of the acoustic control system in two ways as follows: (1) During the revberation sampling period the output voltage is connected through an Own Doppler Nullifier (ODN) relay to the variable reactance tube which is associated with the local oscillator and which is described above. During this time interval the discriminator voltage modifies the frequency of the local oscillator in such a way as to make the reduced signal frequency equal to the characteristic frequency of the discriminator, thereby reducing the output voltage of the discriminator to zero. The proper operation of the ODN relay is accomplished by applying to it a voltage pulse provided by the pulse generator such that the relay is closed during the reverberation sampling period. The resultant effect of this action, known as own Doppler nullification, is to make the reverberation signal at reduced signal frequency equal to the characteristic frequency of the discriminator regardless of variations of own Doppler resulting from variations in the speed of the torpedo. Moreover, the time constants of the reactance tube circuit are long compared to the intervals between successive transmissions, thereby causing the frequency adjustment of the local oscillator to persist throughout the remainder of the listening period. (2) The output voltage of the discriminator is applied to a Doppler gate which is preferably of a type described more fully hereinafter under the sub-heading of Doppler Enablement Channel. The characteristics of the Doppler gate are such that its output voltage is of constant polarity regardless of the polarity of the voltage provided by the discriminator and is of zero magnitude if the discriminator voltage is less than a predetermined threshold value. Except for the unipolarity of the output voltage of the Doppler gate, it is approximately an amplified replica of the voltage output of the discriminator if the voltage output thereof is greater than the threshold value of the Doppler gate, and is maintained greater than the threshold value for more than some predetermined length of time. Because the voltage provided by the discriminator is proportional to the difference between the reduced signal frequency and the characteristic frequency of the discriminator, and because own Doppler nullification maintains this frequency difference zero except during the reception of an echo from a moving target, in which case the frequency difference depends upon the speed and aspect of the target, it is convenient to express the threshold voltage required to obtain an output from the Doppler gate in terms of target speed in knots. Thus, a characteristic of the Doppler gate is that a signal representing an echo from a target causes a voltage output only if the velocity component of the target in the direction of the torpedo exceeds a predetermined value. The voltage output of the Doppler gate is herein called the Doppler enabling pulse.

The Doppler enabling pulse is applied to the Doppler switch in the manner hereinbefore described and allows the common amplifier to supply steering signals to the rudder actuating mechanisms only when such signals are derived from an echo representing a target moving with a velocity component greater than a minimum predetermined value. If during the reverberation sampling time the output voltage of the discriminator supplying the Doppler gate, should exceed the threshold voltage necessary for the generation of a Doppler enabling pulse, a Doppler enabling pulse would be generated even though no target echo is being received. To circumvent this possibility the threshold of the Doppler gate expressed in knots is preferably adjusted to a value greater than the expected change in torpedo speed from one transmission to the next.

The Doppler enabling pulse is applied to the input terminals of the transfer amplifier and the amplifier responds to the presence of a Doppler enabling pulse by energizing the transfer relay, thereby establishing acoustic control. Moreover, the time constants of the transfer amplifier and the transfer relay are long compared to the time intervals separating successive transmissions with the result that the transfer relay remains actuated so long as Doppler enabling pulses are received at regular intervals.

Actuation of the transfer relay causes the acoustic steering signals provided by the azimuth and depth phase-sensitive detectors to be applied to the azimuth and depth steering amplifiers via contacts $S_1$ and $S_2$ thereby making the acoustic control system operative. When not actuated the transfer relay serves to connect the azimuth and depth steering amplifiers to some other source of electrical control signals designated on FIG. 2 as azimuth and depth searching controls.

The searching controls together with the steering amplifiers, the steering relays and the steering motors are utilized to steer the torpedo in the absence of echoes from a moving target. The searching controls may be of any suitable design, but should preferably be such, as to provide a suitable searching pattern for example, a downwardly expanding helix to enhance the probability that the torpedo upon being launched will sooner or later be oriented toward a target. In the event that the torpedo becomes so oriented and receives an echo which produces a Doppler enabling pulse, the transfer relay will operate and the acoustic control system will guide the torpedo toward the target under the control of the circuits operating in the manner set forth.

Figure 3:
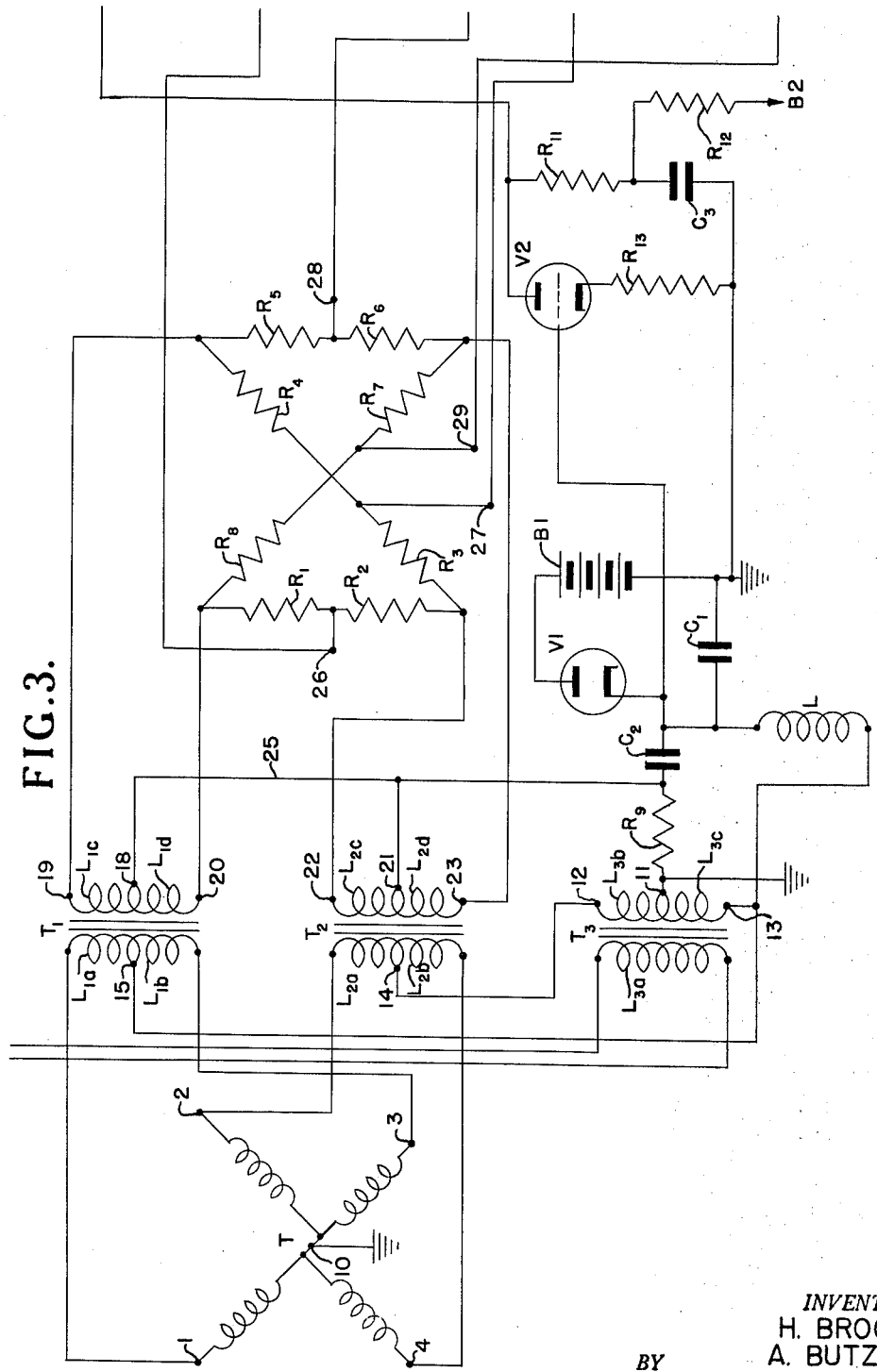
FIG. 3 is a schematic diagram of the input circuit of the echo steering torpedo.

Reference is now made more specifically to FIG. 3 of the drawings, wherein the input circuits are schematically illustrated. For the purpose of facilitating the description of the input circuits, it is assumed that the active face of the transducer T lies in a vertical plane, and the transducer has an axis normal to the face thereof and passing through its center, which axis is hereinafter referred to as the transducer axis. The direction of the sound source is conveniently measured in terms of angular deviation of the sound source from the transducer axis, this deviation being measured in terms of the component deviations in horizontal and vertical planes.

The transducer T comprises several elements electrically connected to form four groups or quadrants numbered 1, 2, 3, and 4, one terminal of each quadrant being joined as at 10 to a common point at ground potential, while the remaining terminal of each quadrant is identified by the number of the quadrant. The ungrounded terminals of diagonally opposite quadrants 1 and 3 are connected by the primary winding $L_{1a}$ and $L_{1b}$ of transformer $T_1$, and the ungrounded terminals of diagonally opposite quadrants 2 and 4 are connected by the primary windings $L_{2a}$ and $L_{2b}$ of transformer $T_2$. The secondary windings $L_{3b}$ and $L_{3c}$ of transformer $T_3$ are connected at a common point 11, at ground potential, the terminals 12 and 13 of the secondary windings $L_{3b}$ and $L_{3c}$ being respectively connected to center taps 14 and 15 on the primaries of transformers $T_1$ and $T_2$.

During transmission, the transmitter to be described more fully hereinafter supplies energy to the primary $L_{3a}$ of transformer $T_3$, energy from the secondary windings $L_{3b}$ and $L_{3c}$ being applied through the primary windings $L_{1a}$, $L_{1b}$, $L_{2a}$ and $L_{2b}$ of the transformers $T_1$ and $T_2$ to the four quardants of the transducer. As is apparent from the drawings, during transmission the potentials with respect to ground of the terminals 12 and 13 of secondary windings $L_{3b}$ and $L_{3c}$ are 180° out of phase, and consequently the currents in quadrants 1 and 3 of the transducer are 180° out of phase with the currents in quadrants 2 and 4. However, the connections to quadrantal elements 1, 2, 3 and 4 are such that all elements vibrate in phase when adjacent quadrants are energized 180° out of phase, whereby the transducer transmission pattern is symmetrical about the transducer axis. Further, the primary windings $L_{1a}$ and $L_{1b}$ of transformer $T_1$ and the primary windings $L_{2a}$ and $L_{2b}$ of transformer $T_2$ have a high coefficient of coupling, thereby causing negligible voltages to be induced in the secondary windings of these transformers due to the excitation of the two primary windings of each of the transformers in phase opposition, as occurs during transmission, and consequently causing negligible power loss in the circuits connected to the secondary windings under those conditions.

As hereinbefore mentioned, the quadrantal elements are so connected that when adjacent quadrants are energized 180° out of phase, all elements vibrate in phase, and consequently during reception when the transducer elements all vibrate in phase, as when energized by an acoustic source on the transducer axis, the voltage generated in each quadrant is 180° out of phase with the voltages generated in the adjacent quadrants. Thus, the voltages generated by quadrants 1 and 3 are in phase with each other and 180° out of phase with the voltages generated by quadrants 2 and 4, when the transducer is energized by an acoustic source on the transducer axis. However, when the source of acoustic energy striking the transducer lies to one side of the transducer axis, the phase relationships among the four output voltages differs from that set forth above, the voltage from a quadrant nearer the sound source being advanced in phase and the voltage from a quadrant farther from the sound source being retarded in phase. FIGURES 11, 12, 13, 14 and 15 are vector diagrams of the voltage outputs of the transducer quadrants and the voltages produced in the input circuit, for different locations of the sound source S, the relative position of the sound source being indicated in each diagram. The voltage vector $E_R$ in each case is the voltage generated at the terminals of the first quadrant when the transducer is energized by a sound source on its axis, the voltage vectors $E_1$, $E_2$, $E_3$ and $E_4$ respectively corresponding to the voltages generated in quadrants 1, 2, 3, and 4.

Figures 15, 16:
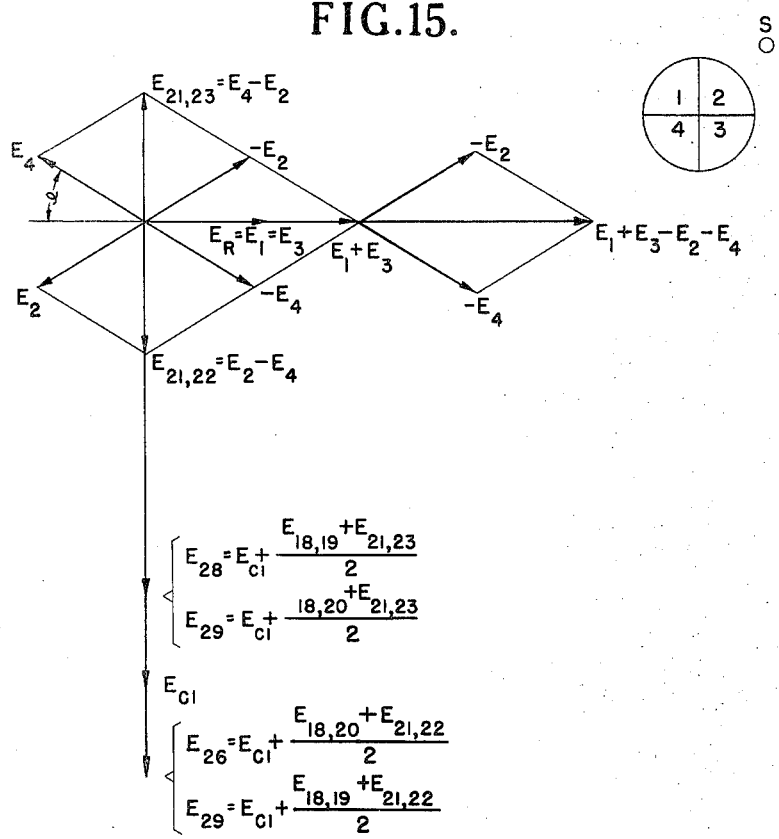

Referring to FIGS. 11, 12, 13 and 14, the angle $\theta$ is the phase shift introduced in the quadrantal voltages due to a predetermined horizontal or vertical angular deviation of the sound source from the transducer axis in the direction indicated, and the angle $\alpha$ in FIG. 15 is the phase shift introduced in one pair of diagonally opposite quadrants due to a predetermined angular deviation of the sound source from the transducer axis when the sound source is so oriented realtive to the transducer axis as to have equal horizontal and vertical component deviations. The phase angles of the vector voltages $E_1$, $E_2$, $E_3$ and $E_4$ relative to the voltage $E_R$ are dependent in sense and magnitude on the direction an amplitude of the horizontal and vertical components of the angular deviation of the sound source from the transducer axis, and increase as the angular deviation of the sound source from the transducer axis increases, subject to limitations which may be imposed by the geometry of the transducer, the phase angles approaching zero as the angular deviation of the sound source from the transducer axis approaches zero.

During reception, the voltages $E_1$ and $E_3$ induced in the respective diagonally opposite quadrants produce additive effects across winding $L_{3c}$ of the secondary of transformer $T_3$, and, similarly, the voltages $E_2$ and $E_4$ produce additive effects across the winding $L_{3b}$. Since the quadrature components of the voltages induced in diagonally opposite quadrants by a sound source displaced from the transducer axis are in opposing phase relation, the quadrature component of the voltage induced in the quadrant nearer the sound source leading, and the quadrature component of the voltage induced in the quadrant farther from the sound source lagging the voltage $E_R$, it is deemed apparent that the quadrature components cancel, and the voltages appearing across $L_{3b}$ and $L_{3c}$ are each proportional to the components of diagonally opposite quadrants which are in phase with each other and with the voltage $E_R$, as is diagrammatically shown in FIGS. 11-15. As the quadrantal elements are so connected that the induced voltages in quadrants 1 and 3 are 180° out of phase with the voltages induced in quadrants 2 and 4, it will be seen that the voltages applied between terminals 12 and 13 and ground, viz. across windings $L_{3b}$ and $L_{3c}$ respectively, are in series aiding, and, due to the close coupling between windings $L_{3b}$ and $L_{3c}$, the voltage across $L_{3c}$ is proportional to the vector sum of the voltages induced in the tranducer diagonals:

(1)  $E_{12,13} = (E_1 + E_3) + (-E_2 - E_4)$

This voltage, as is more fully set forth hereinafter, is utilized to provide a signal for Doppler enablement, as is more fully described hereinafter, the voltage also being utilized in the production of the up, down, right and left steering lobes.

An inductor L and a capacitor $C_1$ are connected in series across winding $L_{3c}$ and operate near series resonance at the transmission frequency. For this condition the voltge across $C_1$ is in approximately 90° lagging phase relation with the driving voltage from $L_{3c}$, and hence with $E_R$. The voltage across $C_1$ is therefore in phase quadrature with the reference voltage $E_R$ and its magnitude is greater than the sum of the transducer output voltage by a factor dependent on the Q of the inductor L, the Q of the inductor L preferably being of the same order of magnitude as the turns ratio $n$ of the transformers $T_1$ and $T_2$.

In the vector diagrams shown in FIGS. 11-15, the turns ratio $n$ and the Q of the inductor were made equal to 1. However, in practice the turns ratio, and consequently the Q of the inductor L will be determined by the step-up ratio necessary to match the impedance of the transducer to the input impedance of the signal amplifier connected thereto.

During reception, the induced voltages $E_1$ and $E_3$ from the respective diagonally opposite quadrants are also applied to the secondary windings $L_{1c}$ and $L_{1d}$ of the transformer $T_1$, the induced voltages $E_2$ and $E_4$ being applied to the secondary windings $L_{2c}$ and $L_{2d}$ of transformer $T_2$. When the coefficients of coupling between the windings of transformer $T_1$ and between the windings of transformer $T_2$ are large, the induced voltages in the secondary windings $L_{1c}$ $L_{1d}$ of transformer $T_1$, viz., between the terminals 18, 19 and terminals 18, 20 respectively, and the induced voltages in the secondary windings $L_{2c}$, $L_{2d}$ of transformer $T_2$, between the terminals 21, 22 and 21, 23 respectively, are given by the vector equations:

(2)  $E_{18,19} = (E_1 - E_3)n$
(3)  $E_{18,20} = (E_3 - E_1)n$
(4)  $E_{21,22} = (E_2 - E_4)n$
(5)  $E_{21,23} = (E_4 - E_2)n$ where $n$ is the turns ratio of transformers $T_1$ and $T_2$.

As hereinbefore mentioned, when the sound source S is on the transducer axis, the voltages $E_1$ and $E_3$ are in phase with each other and with the voltage $E_R$, and the voltages $E_2$ and $E_4$ are in phase with each other and in phase opposition with the voltage $E_R$. Since the intermediate voltages $E_{18,19}$, $E_{18,20}$, $E_{21,22}$ and $E_{21,23}$ are proportional to the vector difference between the induced voltages in diagonally opposite quadrants, it will be appreciated that the intermediate voltages are zero under the above mentioned conditions. However, when the sound source is displaced from the transducer axis, the vector voltages $E_1$, $E_2$, $E_3$ and $E_4$ have components thereof in quadrature with the voltage $E_R$, the voltages induced in the quadrants nearer the sound source having quadrature components which lead the voltage $E_R$, and the quadrants remote from the sound source having quadrature components which lag the voltage $E_R$. The quadrature components in diagonally opposite quadrants are thus in phase opposition, and the voltages $E_{18,19}$, $E_{18,20}$ and the voltages $E_{21,22}$, and $E_{21,23}$ are therefore proportional to the sum of the quadrature components in voltages $E_1$, $E_3$ and voltages $E_2$, $E_4$ respectively as is diagrammatically shown in FIGS. 11–15. Thus, the amplitude of the intermediate voltages is determined by the angular deviation of the sound source relative to the transducer axis, the sense of the intermediate voltages being determined by the direction of displacement of the sound source from the transducer axis.

The taps 18 and 21 of the secondaries of transformers $T_1$ and $T_2$ respectively are connected together and to the resistor R–9, by a conductor 25, and maintained above ground potential by the voltage drop across R–9. The capacitor $C_1$ is coupled by condenser $C_2$ to the resistor R–9, and since the impedance of the capacitor $C_2$ is chosen to be small at the operating frequency of the transducer, the voltage across R–9 is approximately equal to the voltage $E_{c1}$, across condenser $C_1$. The vector potential at taps 18 and 21 of the transformers $T_1$ and $T_2$ is thus either in phase, or in phase opposition with the voltages $E_{18,19}$, $E_{18,20}$, $E_{21,22}$ and $E_{21,23}$, and consequently the amplitude of the potentials, with respect to ground, of terminals 19, 20, 22 and 23 is dependent on the amplitude and sense of the quadrature components in the transducer diagonals. The voltage at terminal 19 is therefore either greater or less than the voltage at terminal 20, dependent on the amplitude and sense of the phase difference between the induced voltages $E_1$ and $E_3$, and, similarly, the voltage at terminal 22 is greater or less than the voltage at terminal 23 dependent on the phase difference between voltages $E_2$ and $E_4$.

Linear combinations of the potentials with respect to ground of terminals 19, 20, 21 and 22 of the secondaries of transformers $T_1$ and $T_2$ are obtained by means of a bridge network, terminals 20 and 22 being connected by series resistors $R_1$ and $R_2$ having a tap 26 therebetween; terminals 19 and 20 being connected by series resistors $R_3$ and $R_4$ having a tap 27 therebetween; terminals 19 and 23 being connected by series resistors $R_5$ and $R_6$ having a tap 28 therebetween; and terminals 20 and 23 being connected to series resistors $R_7$ and $R_8$ having a tap 29 therebetween.

The voltages $E_{26}$, $E_{27}$, $E_{28}$, and $E_{29}$ appearing between output terminals 26, 27, 28 and 29 and ground are averages of each of the potentials appearing at terminals 19, 20 and each of the potentials appearing at terminals 22, 23 and are thus sums made up of the collinear voltages $E_{c1}$ and the bucking voltages between either the upper and lower halves or the right and left halves of the transducer derived by combining the appropriate halves of the secondary voltages of $T_1$ and $T_2$ as follows:

(6)
$$E_{26} = E_{c1} + \frac{E_{18,20} + E_{21,22}}{2} = E_{c1} + (E_3 + E_2 - E_1 - E_4)\frac{n}{2}$$

(7)
$$E_{27} = E_{c1} + \frac{E_{18,19} + E_{21,22}}{2} = E_{c1} + (E_1 + E_2 - E_3 - E_5)\frac{n}{2}$$

(8)
$$E_{28} = E_{c1} + \frac{E_{18,19} + E_{21,23}}{2} = E_{c1} + (-E_3 - E_2 + E_1 + E_4)\frac{n}{2}$$

(9)
$$E_{29} = E_{c1} + \frac{E_{18,20} + E_{21,23}}{2} = E_{c1} + (-E_1 - E_2 + E_3 + E_4)\frac{n}{2}$$

Figure 12:
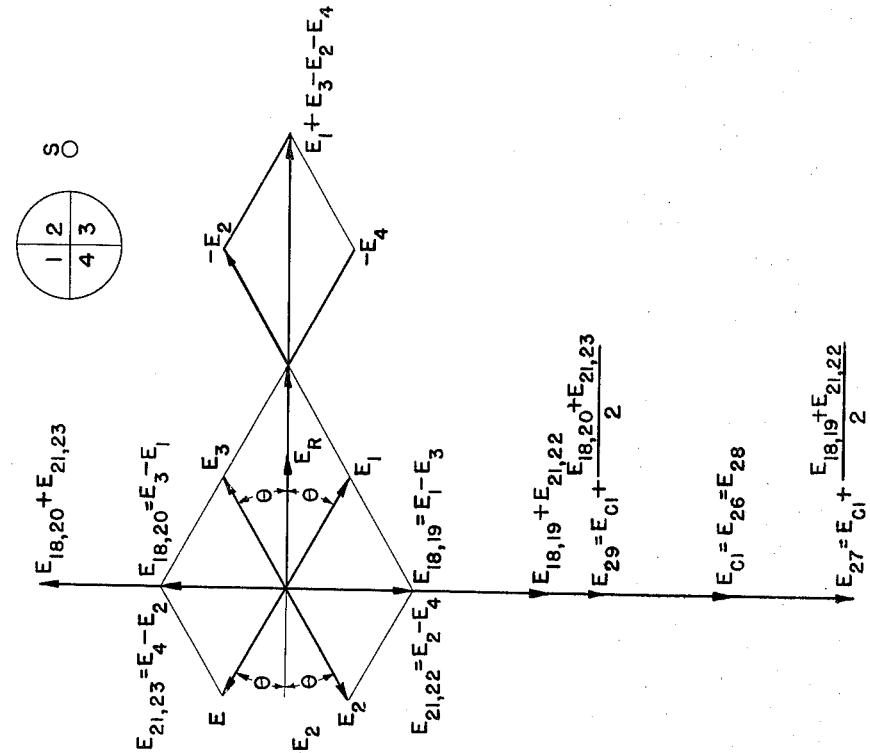
Figure 11:
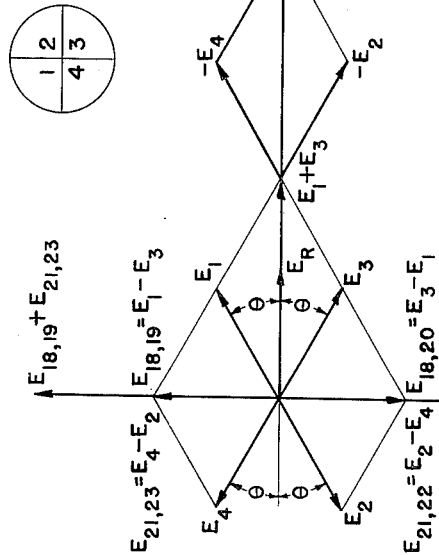

Because the horizontal component of deviation of the sound source does not affect the phase difference between the voltages $E_2$ and $E_3$ or the phase difference between the voltages $E_1$ and $E_4$, the output voltages $E_{26}$ and $E_{28}$ are not affected by such deviations, and remain equal to $E_{c1}$, as shown in FIGS. 12 and 14. The vertical component of deviation of the sound source causes a relative phase shift between the voltages from the upper and lower transducer quadrants giving rise to an increase in the voltage $E_{26}$ and a decrease in the voltage $E_{28}$ when the vertical deviation is upward, as shown in FIG. 11. When the vertical deviation is downward, a decrease in the voltage $E_{26}$ and an increase in the voltage $E_{28}$ ensues, as shown in FIG. 13. When the vertical deviation is zero, the voltages $E_{26}$ and $E_{28}$ are each equal to the voltage $E_{c1}$, as is obvious from Equations 6–9.

Since the vertical component of deviation of the sound source does not affect the phase difference between the voltages $E_1$ and $E_2$ or between the voltages $E_3$ and $E_4$, the output voltages $E_{27}$ and $E_{29}$ are not affected by such deviations, as is illustrated in FIGS. 11 and 13. The horizontal component of deviation of the sound source causes a relative phase shift between the right and left quadrants of the transducer giving rise to an increase in the voltage $E_{27}$ and a decrease in the voltage $E_{29}$ when the deviation is to the right as shown in FIG. 12. When the horizontal deviation is to the left, a decrease in the voltage $E_{29}$ and an increase in the voltage $E_{27}$ ensues, as shown in FIG. 13. When the horizontal deviation is zero, the voltages $E_{27}$ and $E_{29}$ are each equal to the voltage $E_{c1}$.

It will thus be appreciated that the relative amplitudes of the voltages $E_{26}$ and $E_{28}$ are a measure of the magnitude and sign of the vertical component of deviation of the sound source, and that the relative amplitudes of the voltages $E_{27}$ and $E_{29}$ are a measure of the horizontal components of deviation of the sound source. More specifically, the voltages $E_{26}$, $E_{27}$, $E_{28}$ and $E_{29}$ respectively produce up, right, down and left signals for the control of the relatively perpendicular sets of control surfaces on the torpedo, which signals are applied to the steering circuits of the echo ranging torpedo, by way of the quadrature receiver amplifier the operation of which is controlled by the Doppler enablement channel, as described more fully hereinafter.

In order to obviate the necessity of disconnecting the transmitter during reception, and yet prevent excessive loss of energy in the transmitter under those conditions, the transmitter is preferably of the type wherein the output impedance is much greater when the transmitter is not operating than when the transmitter operates. The transformer $T_3$ is designed to match the impedance of the transmitter to the transducer during transmission, thus insuring maximum power transfer during transmission. However, during reception, the increased output impedance of the transmitter insures that negligible power is dissipated in the transmitter because of the mismatch then existing.

A diode tube $V_1$ and negative bias voltage $B_1$ are connected in series across the capacitor $C_1$. The bias voltage on the plate of $V_1$ is made greater than the maximum voltage across $C_1$ anticipated during reception, and thus the tube does not conduct during reception and does not affect the receiving circuit. However, during transmission, the voltage across $C_1$ may exceed the bias voltage $B_1$, causing the tube $V_1$ to conduct, at which time the Q of the circuit composed of L, $C_1$ and $V_1$ is reduced, and the development of excessive voltages across $C_1$ is prevented.

The voltage appearing across condenser $C_1$, which voltage is hereinafter referred to as the center signal, is applied to the grid of a triode amplifier $V_2$, the output of which appears across load resistor $R_{11}$ connected to the plate thereof. As is conventional, plate potential for the triode is applied from plate supply $B_2$ through the decoupling filter comprising resistor $R_{12}$ and condenser $C_3$, and grid bias is afforded by cathode resistor $R_{13}$.

As hereinbefore set forth, the cophased output voltages $E_{26}$, $E_{27}$, $E_{28}$ and $E_{29}$ appearing at the respective terminals of the input circuits, i.e., the up, left right and down signals respectively, vary in amplitude in accordance with the direction of incidence of acoustic energy on the quadrantally-split transducer T. Since, as a practical matter, it is extremely difficult to construct a plurality of amplifier channels having identical gain characteristics, and since the steering intelligence is contained in the relative amplitudes of the output voltages, the latter are preferably amplified in a common channel. The quadrature receiver amplifier of the present invention affords common channel amplification of the four output voltages, and, additionally, effectuates comparisons of the relative amplitudes of the up and down pair of signals and the right and left pair of signals, and produces steering voltages having amplitude and sense characteristics correlative therewith. Further, the center voltage appearing at the output of amplifier tube $V_2$ is also amplified in the quadrature receiver, and utilized in a manner hereinafter described, to control the amplification of the output voltages and the application thereof to the torpedo steering mechanism.

QUADRATURE RECEIVER AMPLIFIER

The four output voltages of amplitudes $E_{26}$, $E_{28}$, $E_{27}$ and $E_{29}$, and of a common angular frequency $\omega_1$, such as 60 kc., are applied respectively to four modulator tubes $V_3$, $V_4$, $V_5$ and $V_6$. The oscillator and phase shifting network, as hereinbefore described, provide four modulating voltages $E_a$, $E_b$, $E_c$ and $E_d$ of angular frequency $\omega_2$, such as 1 kc. and of progressive 90° phase relation so that the relative phase angles of the modulating voltages are respectively 0°, 90°, 180° and 270°, the modulating voltages $E_b$, $E_d$, $E_a$ and $E_c$ being respectively applied to modulator tubes $V_3$, $V_4$, $V_5$ and $V_6$.

The output voltages of each of the modulator tubes $V_3$, $V_4$, $V_5$ and $V_6$ are amplitude modulated voltages respectively proportional to:

(10) $\quad \text{Up} = E_{26} \cos \omega_1 t (1 + M \cos \omega_2 t)$
(11) $\quad \text{Down} = E_{28} \cos \omega_1 t (1 - \cos \omega_2 t)$
(12) $\quad \text{Right} = E_{27} \cos \omega_1 t (1 + M \sin \omega_2 t)$
(13) $\quad \text{Left} = E_{29} \cos \omega_1 t (1 - M \sin \omega_2 t)$ where M is the modulation factor associated with the modulators.

The output voltages of the four modulators are combined giving rise to a resultant voltage which has, as its fundamental component:

(5)
$$\text{Resultant} = \cos \omega_1 t [(E_{26} + E_{27} + E_{28} + E_{29}) + M(E_{26} - E_{28}) \cos \omega_2 t + M(E_{27} - E_{29}) \sin \omega_2 t$$

The resultant modulated voltage is applied to a 60 kc. band pass filter which is designated to pass the signal frequency plus and minus an amount equal to the maximum frequency deviation expected from target Doppler plus the frequency of the modulating voltages, the output of the 60 kc. filter being applied to the wide band common amplifier. Also applied to the amplifier is a voltage having an amplitude correlative with the center signal $E_t$, but which is at a relatively reduced frequency, the frequency reduction being achieved in the converter which employs a local oscillator of a frequency such as 53 kc., whereby the frequency of the voltage derived from the converter, hereinafter referred to as the reduced signal frequency, is 7 kc. This reduced signal frequency is applied to a 7 kc. band pass filter, the output of which is applied to the common amplifier.

As hereinbefore set forth, the center signal, at reduced signal frequency is applied, by way of an amplifier and a 7 kc. band pass filter, to automatic gain control circuits which include the AVC rectifier and the AVC charge-discharge circuit, the output of which automatic gain control circuits is applied to the common amplifier, whereby the amplification of the resultant modulated voltage and the center signal is controlled by variations in amplitude of the center signal $E_f$. The automatic gain control circuit is preferably such that it does not respond immediately to rapid increases in the magnitude of the center signal, but instead merely holds the slowly varying incoming signals below a given threshold which may be exceeded by a rapid increase in level thereof.

The resultant modulated voltage, after being amplified in the common amplifier is applied, by way of the Doppler enabling switch and 60 kc. band pass filter, to a demodulator, the output voltage of which consists of a D.C. component and the positive resultant modulation envelope of the 60 kc. carrier. The resultant modulation envelope is proportional to:

(14) $\quad (E_{26} - E_{28}) \cos \omega_2 t + (E_{27} - E_{29}) \sin \omega_2 t$ This envelope is the resultant of two signals in quadrature, the components $\cos \omega_2 t$ being modulated with the differential between the up and down signals and the components $\sin \omega_2 t$ being modulated with the differential between the right and left signals. Only the A.C. portion of the envelope is applied to the 1 kc. amplifier, the output of which is an amplified replica of the input. The amplified replica of the modulation envelope is applied to a 1 kc. band pass filter, the pass band of which only includes frequencies near $\omega_2$, whereby any harmonically related components of the voltage given by Equation 14, which may be present, due to non-linear operation of the modulator tubes $V_3$, $V_4$, $V_5$ and $V_6$ are removed.

The output voltage from the 1 kc. band-pass filter is applied to azimuth and depth phase-sensitive detectors, the phased modulating voltages applied to modulators $V_3$, $V_4$, $V_5$ and $V_6$ also being applied to the phase-sensitive detectors and cause the latter to operate in synchronism with the modulators. The depth phase-sensitive detector is made insensitive during time intervals $$\frac{\pi}{2} < \omega_2 t < 3\frac{\pi}{2}$$

while it responds to the applied resultant modulation envelope during time intervals $$-\frac{\pi}{2} < \omega_2 t < \frac{\pi}{2}$$

The output of the depth phase-sensitive detector is proportional to:

(15)
$$\int_{-\frac{\pi}{2}}^{\frac{\pi}{2}} [(E_{26} - E_{28}) \cos \omega_2 t + (E_{27} - E_{29}) \sin \omega_2 t] d\omega_2 t$$
$$= (E_{26} - E_{28}) \sin \omega_2 t$$
$$- (E_{27} - E_{29}) \cos \omega_2 t \Big|_{-\frac{\pi}{2}}^{\frac{\pi}{2}} = 2(E_{26} - E_{28})$$

The azimuth phase-sensitive detector is made insensitive during time intervals $\pi < \omega_2 t < 2\pi$, while it responds to an applied voltage during the intervals $0 < \omega_2 t < \pi$. The voltage output of the azimuth phase-sensitive detector is thus proportional to:

(16)
$$\int_0^\pi [(E_{26} - E_{28}) \cos \omega_2 t + (E_{27} - E_{29}) \sin \omega_2 t] d\omega_2 t$$
$$= (E_{26} - E_{28}) \sin \omega_2 t$$
$$- (E_{27} - E_{29}) \cos \omega_2 t \Big|_0^\pi = 2(E_{27} - E_{29})$$

Thus, the resultant action of the device as a whole is that the output of the depth phase-sensitive detector is a voltage, the value of which is proportional to the algebraic difference between the amplitudes of the up and down signals, while the output of the azimuth phase-sensitive detector is a voltage, the value of which is proportional to the amplitude of the right and left signals.

Figure 4:
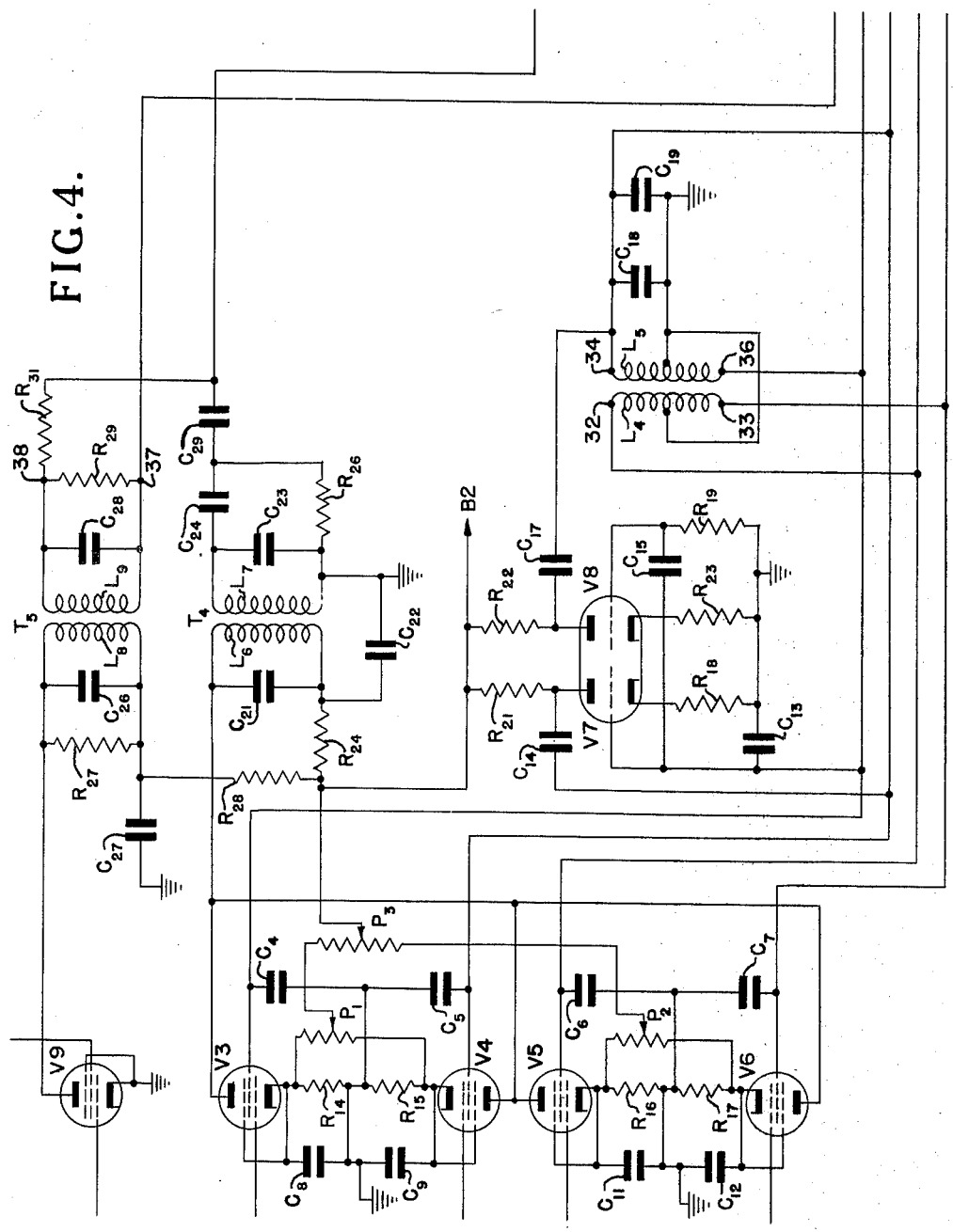
FIG. 4 is a schematic diagram of a portion of the quadrature receiver amplifier including the electronic commutator.
Figure 5:
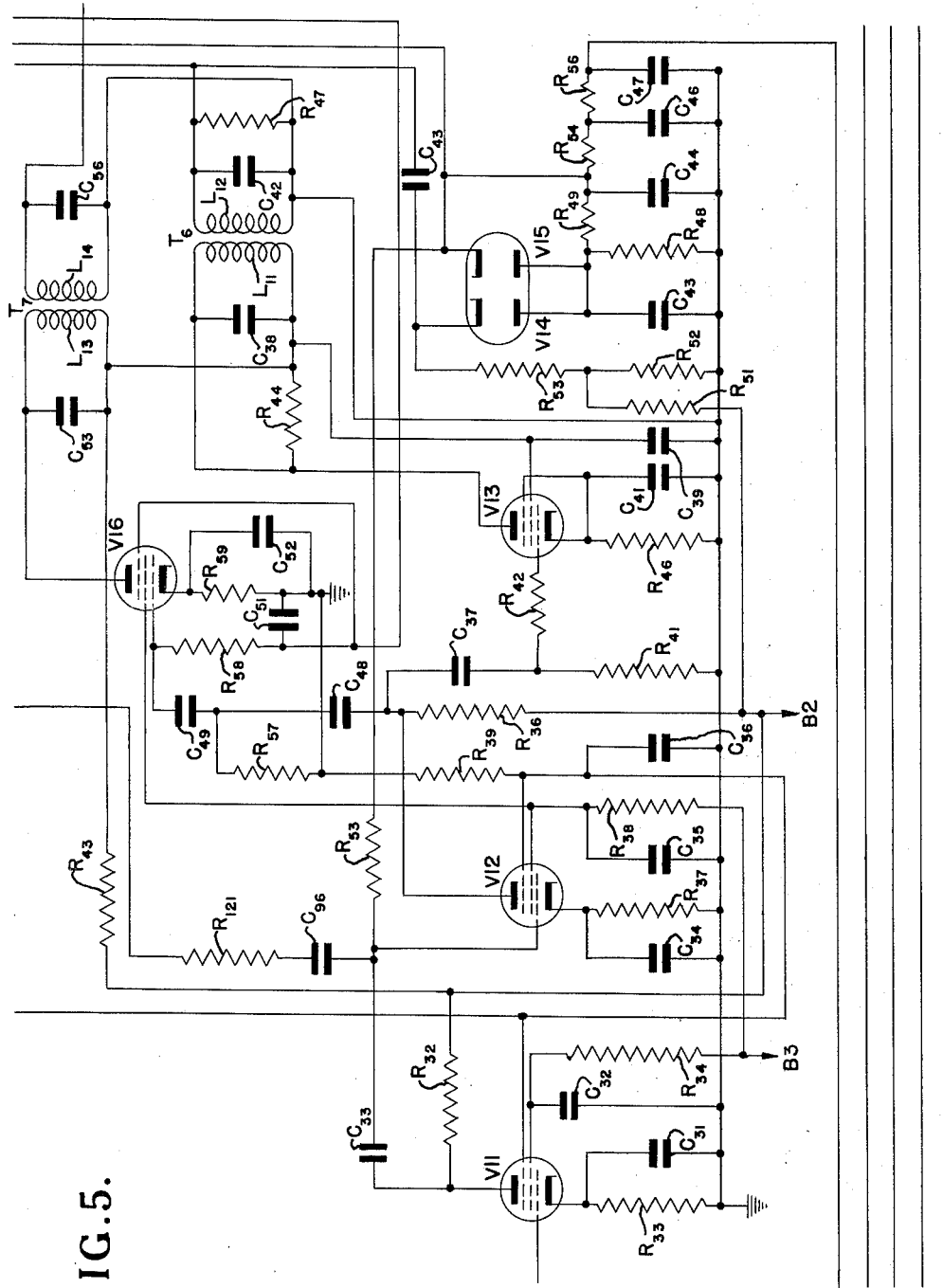
FIG. 5 is a schematic diagram of an intermediate portion of the quadrature receiver including the AVC circuits and Doppler switch.
Figure 6:
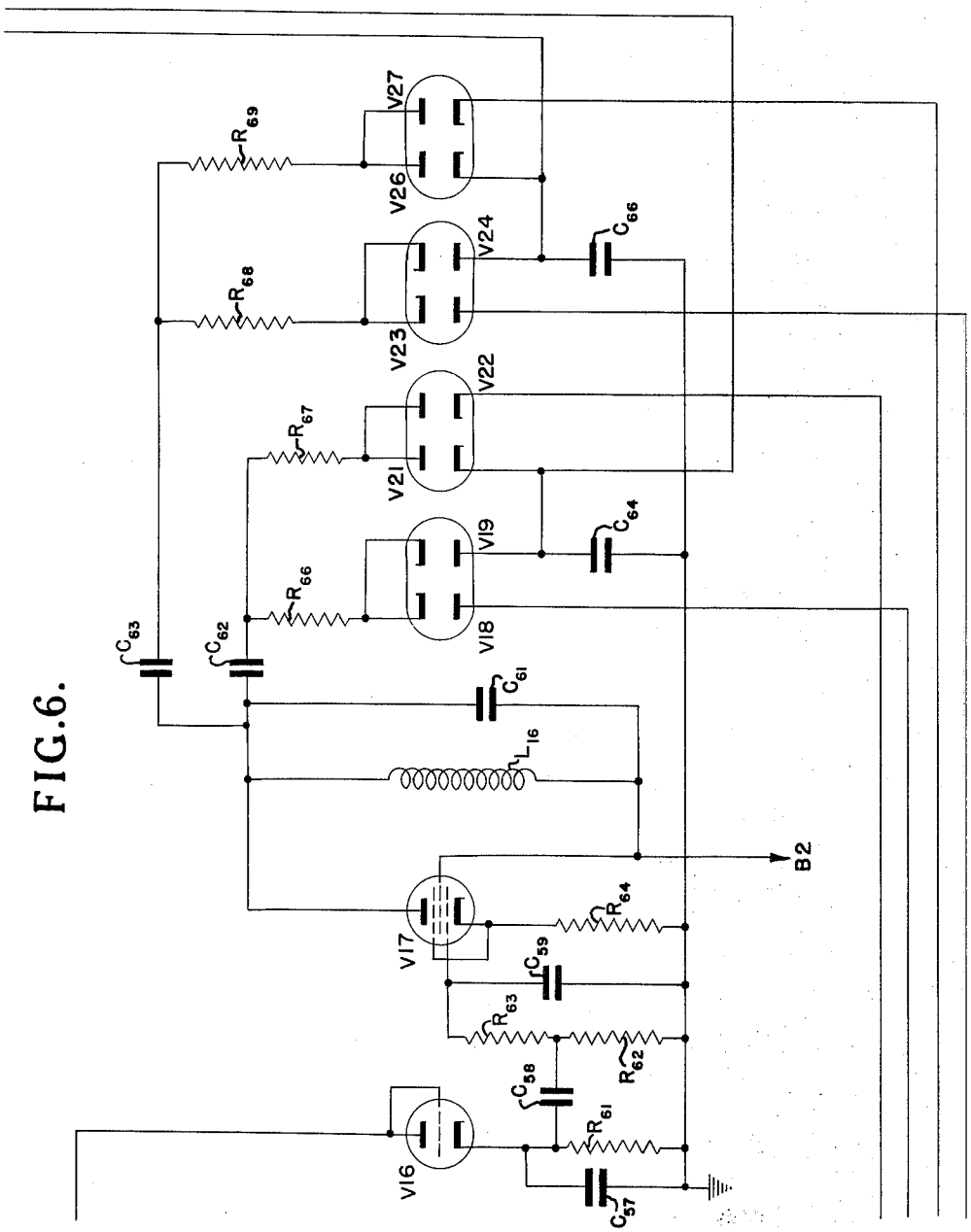
FIG. 6 is a schematic diagram of a final portion of the quadrature receiver amplifier and including the phase-sensitive detectors.
Figure 7:
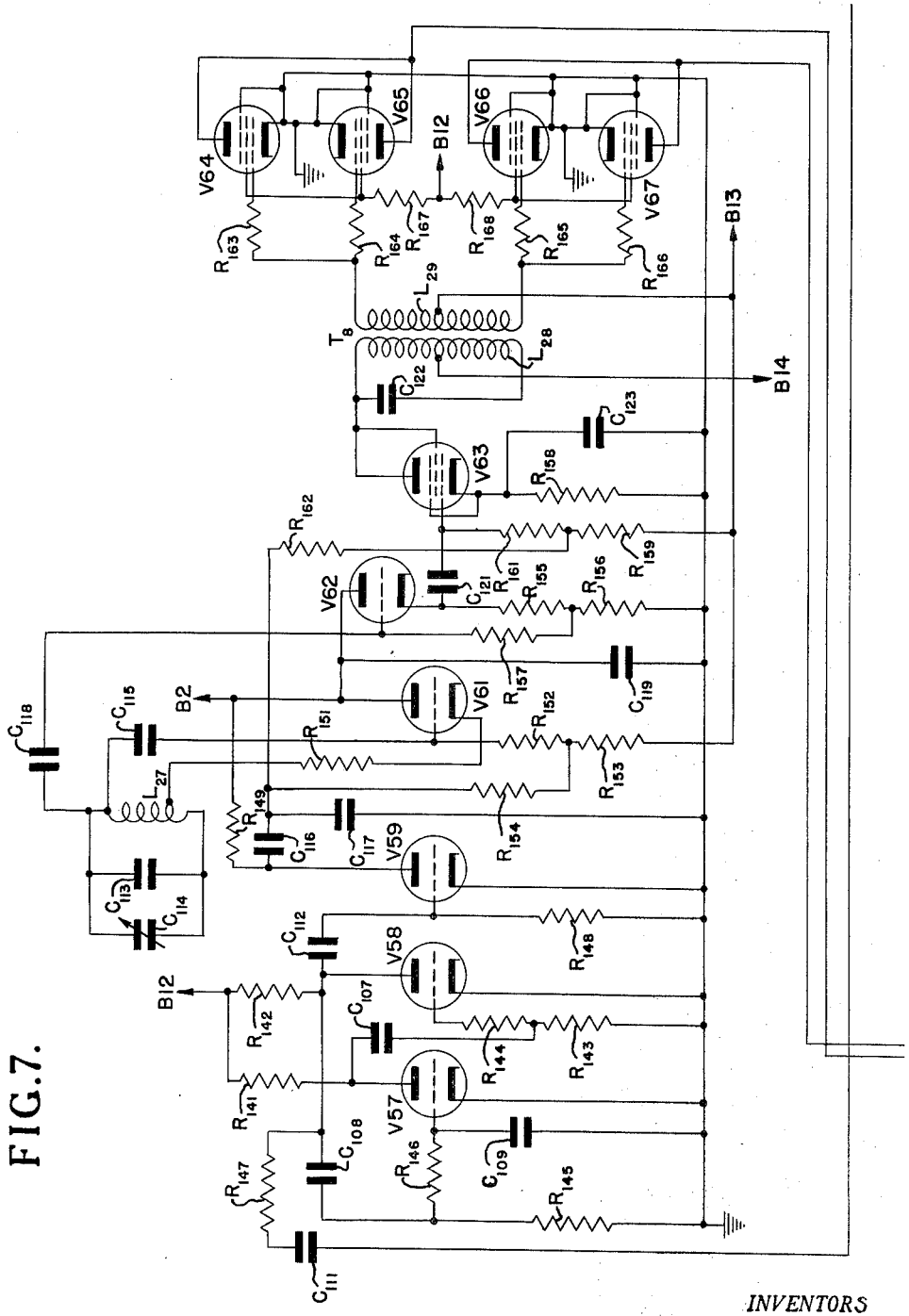
FIG. 7 is a schematic diagram of the pulse generator and transmitter.
Figure 8:
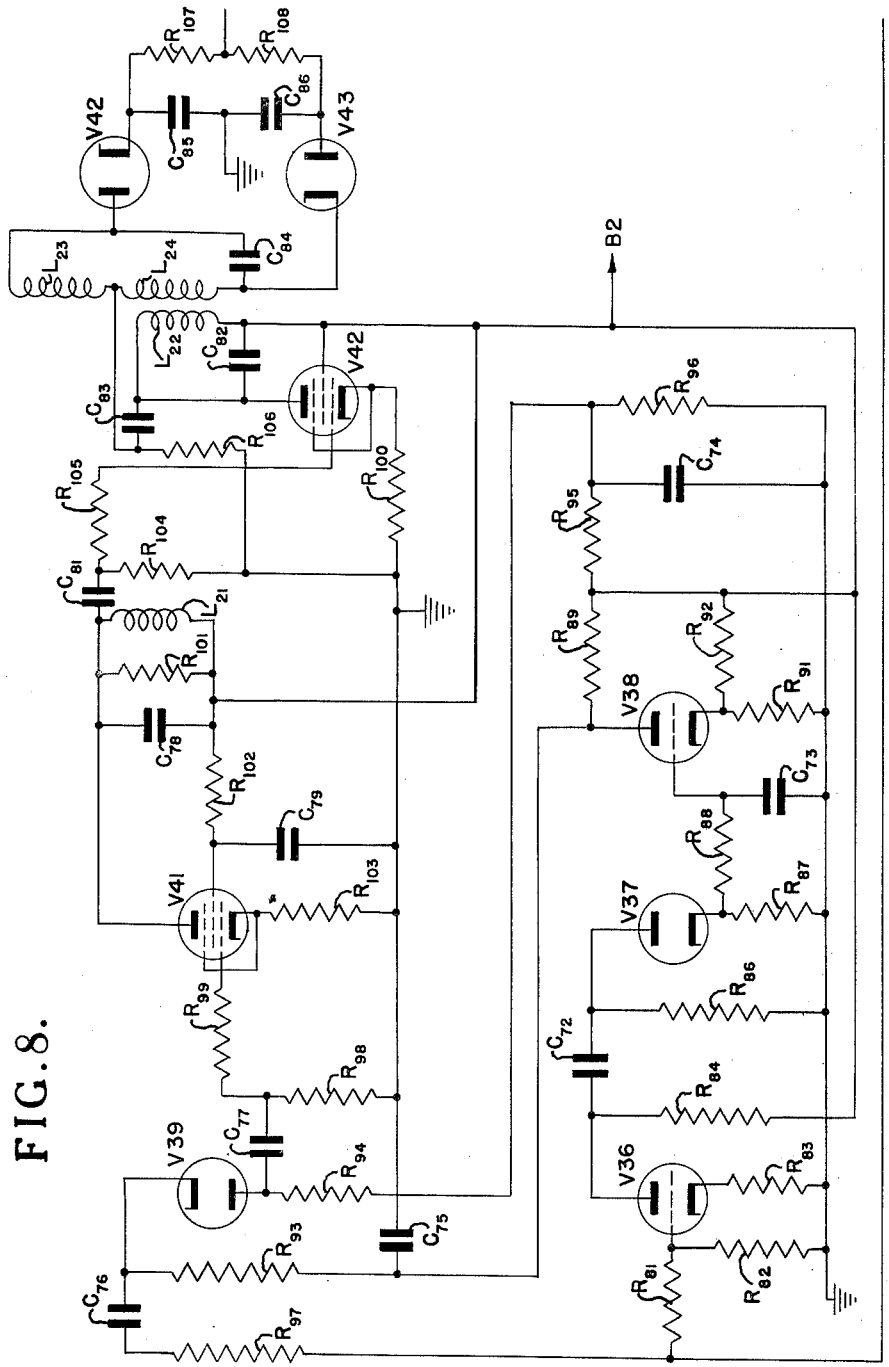
FIG. 8 is a schematic diagram of a portion of the Doppler enablement channel and including the amplitude gate and frequency discriminator.

Reference is now made more specifically to the schematic diagram of the quadrature receiver illustrated in FIGS. 4, 5 and 6.

The four output voltages $E_{26}$, $E_{28}$, $E_{27}$ and $E_{29}$ of a frequency of 60 kc., which respectively correspond to the up, down, right and left signals produced by the transducer T and input circuits are applied to the control grids of modulator tubes $V_3$, $V_4$, $V_5$, and $V_6$ respectively. Modulating voltages of a frequency of 1,000 cycles per second and of relative phase 90°, 270°, 0° and 180°, produced in the oscillator and phase shift network in a manner more fully described hereinafter, are applied to the screen grids of modulator tubes $V_3$, $V_4$, $V_5$, and $V_6$, respectively, the screen grids of the tubes being otherwise connected to ground by identical capacitors $C_4$, $C_5$, $C_6$ and $C_7$. The capacitance of the capacitors $C_4$, $C_5$, $C_6$ and $C_7$ is chosen such that the reactance of each capacitor is small at the signal frequency but large at the modulating frequency, thereby causing the potential from screen grid to ground of each modulator tube to be negligible at signal frequencies and appreciable at modulating frequencies.

Bias for each of the modulator tubes is provided by cathode biasing circuits $R_{14}C_8$, $R_{15}C_9$, $R_{16}C_{11}$ and $R_{17}C_{12}$ which respectively connect the cathodes of modulator tubes $V_3$, $V_4$, $V_5$ and $V_6$ to ground. Since satisfactory switching without the introduction of appreciable switching transients is dependent, among other factors, on having a low absolute value of plate current during the time each modulator is conducting, and since the conventional grid bias circuits would not be effective under those conditions, a bleeder system is utilized to provide bias for the modulators, which bleeder system includes a potentiometer $P_1$ connected to the cathodes of modulator tubes $V_3$ and $V_4$ for balancing the amplification thereof; a potentiometer $P_2$ connected to the cathodes of modulator tubes $V_5$ and $V_6$ to obtain balance of amplification therebetween; and a third balancing potentiometer $P_3$ which is connected to the taps on potentiometers $P_1$ and $P_2$ to provide balance of amplification between the azimuth and depth channels, the tap on the potentiometer $P_3$ being connected to supply potential $B_2$.

The modulating voltages applied to the modulator tubes are developed in the circuits associated with the tubes $V_7$ and $V_8$. The triode $V_7$, together with the tank circuit comprising center-tapped inductor $L_4$, and capacitor $C_{13}$ form a conventional feed-back oscillator having a cathode biasing resistor $R_{18}$ and a plate blocking condenser $C_{14}$, the latter affording frequency stability against changes in supply voltages. The coefficient of coupling between the two halves of the inductor $L_4$ is made large, thereby insuring that the voltages induced in the two halves are of nearly equal amplitude and 180° out of phase. The voltages appearing at terminals 32 and 33 are thus 180° out of phase and are applied, as hereinbefore set forth, to the screen grids of modulator tubes $V_5$ and $V_6$.

The voltage developed across one-half of $L_4$ is applied through the 90° phase-shift circuit comprising coupling capacitor $C_{15}$ and resistor $R_{19}$ to the grid of triode tube $V_8$, which tube acts as a phase-shift amplifier. The load impedance of the phase-shift amplifier, which is coupled to the plate of tube $V_8$ by condenser $C_{17}$, consists of a center-tapped inductor $L_5$, a portion of which is tuned by capacitors $C_{18}$ and $C_{19}$ to resonate at a frequency near 1,000 cycles per second. The coefficient of coupling between the two halves of inductor $L_5$ is made large thereby insuring that the voltages induced in the two halves are of nearly equal amplitude and 180° phase difference, and by proper choice of capacitors $C_{18}$ and $C_{19}$, the voltages induced in $L_5$ are caused to be in phase quadrature with respect to the corresponding voltages induced in $L_4$. The voltages appearing at terminals 34 and 36 of the inductor $L_5$ are thus 180° out of phase with each other and in phase quadrature with the voltages appearing at terminals 32 and 33, the voltages at terminals 36 and 34 being applied respectively to the screen grids of modulator tubes $V_3$ and $V_4$ whereby the latter pair of modulators operate in phase quadrature with the modulator tubes $V_5$ and $V_6$.

Power is applied to the plate of oscillator section $V_7$ and the amplifier section $V_8$ from plate supply source $B_2$ through resistors $R_{21}$ and $R_{22}$ respectively, grid bias for the amplifier being provided by the resistor $R_{23}$, as is conventional.

The output voltages of the modulator tubes are combined by connecting their plates together through a common plate load comprising inductor $L_6$ and capacitor $C_{21}$ which form the primary circuit of band-pass filter $T_4$, the primary circuit being otherwise connected through resistor $R_{24}$ to the plate supply source $B_2$, the resistor $R_{24}$ being by-passed to ground by capacitor $C_{22}$. The secondary circuit of filter $T_4$, includes inductor $L_7$ which is magnetically coupled to the primary circuit, and a shunt capacitor $C_{23}$, the filter $T_4$ being tuned so that the pass-band thereof includes the signal frequency of 60 kc. and a band of adjacent frequencies sufficient to include at least the first side bands produced by the modulator tubes. The output of filter $T_4$ is applied to a high-pass RC filter comprising resistor $R_{26}$ and capacitor $C_{24}$ to reduce the amplitude of the 1 kc. and low-order harmonics thereof which pass through the filter $T_4$.

The center signal $E_f$, of a frequency of 60 kc., is applied to the control grid of a converter tube $V_9$, and a local oscillator signal of 53 kc. from the oscillator is injected at the screen grid. The plate of the converter is connected through the plate load circuit which forms the primary of band pass filter $T_5$, and which includes resistance $R_{27}$, capacitor $C_{26}$ and inductor $L_8$; through resistor $R_{28}$ to the positive plate supply battery $B_2$, the primary circuit also being connected through by-pass condenser $C_{27}$ to ground.

The secondary circuit of band pass filter $T_5$ comprises inductor $L_9$, capacitor $C_{28}$ and resistor $R_{29}$, the filter being so designed that the difference frequency between the 53 kc. local oscillator signal and the 60 kc. incoming signal is passed by the filter while the local oscillator frequency and the sum of the local oscillator frequency and the incoming signal frequency are highly attenuated thereby.

The output of band pass filter $T_4$ is coupled by capacitor $C_{29}$ to the control grid of $V_{11}$ which is the first amplifier tube of a common channel wide band amplifier, the signal between terminals 37 and 38 on the secondary circuit of $T_5$ also being applied, through resistor $R_{31}$, to the control grid of $V_{11}$, whereby the combined 60 kc. output of modulator tubes $V_3$, $V_4$, $V_5$ and $V_6$ and the center signal at reduced frequency of 7 kc., are amplified in the same amplifier channel. The plate of the amplifier tube $V_{11}$ is connected by resistor $R_{32}$ to the plate supply battery $B_2$, grid bias being provided by self-biasing circuit comprising resistor $R_{33}$ and capacitor $C_{31}$. The screen grid of amplifier tube $V_{11}$ is connected by resistor $R_{34}$ to a source of positive screen bias $B_3$, and through by-pass capacitor $C_{32}$ to ground as is conventional.

The output of amplifier $V_{11}$ is applied through coupling condenser $C_{33}$ to the control grid of amplifier tube $V_{12}$ which is the second stage of the common channel amplifier. The plate supply for this latter stage is obtained from battery $B_2$, through voltage dropping resistor $R_{36}$, and negative grid bias afforded by a self biasing circuit comprising resistor $R_{37}$ and by-pass condenser $C_{34}$, as is conventional. Positive bias from supply $B_3$ is applied through resistor $R_{38}$ which is shunted to ground by condenser $C_{35}$, to the screen grid of the tube $V_{12}$, and a negative blanking pulse from the transmitter is applied across resistor $R_{39}$ and capacitor $C_{36}$ to the suppressor grids of amplifier tubes $V_{11}$ and $V_{12}$, in order to prevent amplification of the signals applied to the control grids thereof, during transmission periods.

The output of the common amplifier channel is applied, through coupling condenser $C_{37}$, to grid-leak resistor $R_{41}$, and the voltage produced across the latter is applied through resistor $R_{42}$ to the grid of the AVC driver amplifier tube $V_{13}$, the resistor $R_{42}$ affording some attenuation of the 60 kc. signal which would otherwise be applied to amplifier tube $V_{13}$. Positive potential is applied by potential source $B_2$ through resistor $R_{43}$, to the screen grid of $V_{13}$ and to the primary circuit of band-pass filter $T_6$, which primary circuit, including inductor $L_{11}$, capacitor $C_{38}$ and resistor $R_{44}$, forms the plate load of amplifier tube $V_{13}$. As is conventional, the screen grid is coupled by condenser $C_{39}$ to ground, negative grid bias provided by the bias circuit comprising resistor $R_{46}$ and capacitor $C_{41}$. The secondary circuit of band-pass filter $T_6$ includes inductor $L_{12}$, capacitor $C_{42}$ and resistor $R_{47}$, and the output thereof, which includes only signals having a frequency near 7 kc., is applied through condenser $C_{43}$ to automatic gain control circuits including diode tube sections $V_{14}$ and $V_{15}$ and associated filters.

The diode section $V_{14}$ constitutes the AVC rectifier having a parallel RC detector circuit including resistor $R_{48}$ and capacitor $C_{43}$ in the plate circuit thereof, which detector circuit is shunted by series RC circuit including resistor $R_{49}$ and capacitor $C_{44}$. Delayed AVC is effectuated by the application of positive bias from battery $B_2$ to the cathode of tube $V_{14}$, by way of a bleeder system comprising resistors $R_{51}$ and $R_{52}$, and resistor $R_{53}$. This delay permits the realization of flatter AVC characteristics than would be obtained with no delay. The diode section $V_{15}$ is utilized to speed up the recovery time of the AVC system when the incoming signal level decreases, in order to prevent blanking of a desired signal by immediately preceeding high level spurious signals, such as wake echoes detected by the transducer T. The inherent characteristics of AVC are such that effect of an increase in level actuates the AVC circuits faster than gain will be restored upon a corresponding decrease in level. The diode section $V_{15}$ short-circuits $R_{49}$ when the signal level decreases, and thus helps to produce the same actual attack and release times in the AVC system. The AVC signal appearing across condenser $C_{44}$, and hereinafter referred to as fast AVC is applied, through resistor $R_{53}$ to the control grid of amplifier tube $V_{12}$. The AVC voltage across $C_{44}$ is also applied to a two stage RC filter network comprising resistor $R_{54}$, capacitor $C_{46}$, resistor $R_{56}$ and capacitor $C_{47}$, the output of which filters is hereinafter referred to as slow AVC, and is applied to terminal 37 of the second of the secondary circuit of band-pass filter $T_5$, and is thereby impressed on the control grid of amplifier $V_{11}$. Thus, slow variations in amplitude of 7 kc. center signal frequency are utilized to control the amplification of the amplitude modulated up, down, right and left incoming signals in the common amplifier, and serve to hold the slowly varying incoming signals below a given threshold value which may be exceeded by a rapid increase in level such as would be produced by an echo. However, when the signal to background ratio becomes very high, the final stage of the common amplifier becomes overloaded, thus smoothing out the modulation of the 60 kc. resultant modulated voltage. For this reason, a small amount of compression is used on the final stage of the common amplifier, which compression is supplied by the signal hereinbefore referred to as fast AVC.

The output of common amplifier tube $V_{12}$ is also applied to an RC filter comprising resistor $R_{57}$ and capacitor $C_{48}$ which provide some attenuation of the 7 kc. signal, the output of the filter being applied through condenser $C_{49}$ and resistor $R_{58}$ to the control grid of the Doppler switch tube $V_{16}$. The tube $V_{16}$ is normally maintained non-conducting by negative bias provided in the Doppler discriminator circuit, and is rendered conducting by a positive enabling pulse created in the discriminator circuit as more fully described hereinafter, the negative bias and positive enabling pulse being applied to the suppressor grid of $V_{16}$ and to the control grid thereof through resistor $R_{58}$. As is more fully described hereinafter, the output of band-pass filter $T_6$ is also applied to the Doppler discriminator circuit, which last mentioned circuit produces an enabling pulse only when an echo is being received by the transducer T, and only in the event that the intensity of the echo is greater by a predetermined amount than the intensity of the concurrent reverberation, and only in the event that the frequency of the echo has predetermined characteristics, and only in the event that the duration of the echo is greater than a predetermined length of time. The resistor $R_{58}$ is by-passed to ground by capacitor $C_{51}$, and a grid-bias circuit including $R_{59}$ and $C_{52}$ is provided in the cathode circuit of $V_{16}$, for obvious reasons.

Plate supply for the Doppler switch is obtained from potential source $B_2$ through $R_{43}$ and the primary circuit of 60 kc. band-pass filter $T_7$ including inductor $L_{13}$ and capacitor $C_{53}$, which primary circuit forms the plate load of the Doppler switch. The primary circuit is returned to ground through condenser $C_{39}$, and is coupled to the secondary circuit including inductor $L_{14}$ and capacitor $C_{56}$. Band-pass filter $T_7$ is designed to pass only those frequencies near 60 kc. and the output thereof is applied to the plate of detector tube $V_{16}$. The detector output appearing across the detector circuit comprising resistor $R_{61}$ and condenser $C_{57}$ includes a D.C. component plus an A.C. signal which is approximately equal to an amplified replica of the modulation envelope of the combined outputs of the modulator tubes $V_3$, $V_4$, $V_5$ and $V_6$. The detector output signal is applied through coupling condenser $C_{58}$ which blocks the D.C. component, to resistor $R_{62}$, the output of which is applied through the phase shifting RC circuit comprising resistor $R_{63}$ and condenser $C_{59}$ to the control grid of a high gain amplifier tube $V_{17}$. The amplifier tube $V_{17}$ has a bias resistor $R_{64}$ in the cathode circuit thereof and a tuned plate load comprising inductor $L_{16}$ and capacitor $C_{61}$ which is suitably connected to plate supply source $B_2$, the plate circuit being carefully tuned so as to be anti-resonant at a frequency of 1 kc. whereby the tuned circuit tends to reduce the response of the amplifier to components of the modulation envelope other than the fundamental component of 1,000 cycles per second. Positive potential is also applied from potential source $B_2$ to the screen grid of the amplifier, as is conventional.

The output of amplifier $V_{17}$ is applied through capacitor $C_{62}$ and resistor $R_{66}$ to the cathodes of diode tube sections $V_{18}$ and $V_{19}$, and through resistor $R_{67}$ to the plates of diode tube sections $V_{21}$ and $V_{22}$. The amplifier output is also applied through capacitor $C_{63}$ and resistor $R_{68}$ to the cathodes of diode tube sections $V_{23}$ and $V_{24}$, and through resistor $R_{69}$ to the plates of diode tube sections $V_{26}$ and $V_{27}$.

Referring now to the depth phase-sensitive detector comprising tube sections $V_{18}$, $V_{19}$, $V_{21}$ and $V_{22}$, there are respectively applied to the plate of $V_{18}$ and the cathode of $V_{22}$, the same modulating voltages which are applied to the modulator tubes $V_4$ and $V_3$. During that portion of the cycle when the plate of $V_{18}$ and the cathode of $V_{22}$ are respectively positive and negative with respect to ground, that is when $$\frac{\pi}{2} < \omega_2 t < 3\frac{\pi}{2}$$

a current flows through $V_{18}$, through resistors $R_{66}$ and $R_{67}$, and through tube $V_{22}$. The resulting potential drops across the resistors $R_{66}$ and $R_{67}$ maintain the cathode of $V_{19}$ positive with respect to ground and the plate of $V_{21}$ negative with respect to ground, and thereby prevent currents from flowing through diode tube sections $V_{19}$ and $V_{21}$. The plate of tube section $V_{19}$ and the cathode of $V_{21}$ are coupled to ground by capacitor $C_{64}$, and when no current flows through the respective tube sections, the voltage across $C_{64}$ remains constant. During that portion of the modulation cycle when the plate of $V_{18}$ and the cathode of $V_{22}$ are respectively negative and positive with respect to ground, that is when $$-\frac{\pi}{2} < \omega_2 t < \frac{\pi}{2}$$

no current flows through resistors $R_{66}$ and $R_{67}$ as a result of the modulation voltage applied, and the potentials at the cathode of $V_{19}$ and the plate of $V_{21}$ are determined by the instantaneous output of amplifier tube $V_{17}$. When the output of amplifier $V_{17}$ is positive with respect to ground, a current flows through $V_{21}$ and charges capacitor $C_{64}$ positively with respect to ground, and when the output of amplifier $V_{17}$ is negative with respect to ground, a current flows through $V_{19}$ and charges capacitor $C_{64}$ negatively with respect to ground. Under these conditions, the voltage across capacitor $C_{64}$ is approximately equal to the definite integral of the voltage output of amplifier $V_{17}$ over the time interval described.

It will thus be appreciated that the voltage across capacitor $C_{64}$ is given approximately by Equation 15 supra, page 36; that this voltage is approximately equal to the algebraic difference between the amplitudes of the up and down signals applied to the control grids of modulator tubes $V_3$ and $V_4$, and that the voltages applied to the modulators $V_5$ and $V_6$ do not influence the voltage across $C_{64}$.

The azimuth phase-sensitive detector comprising diode tube sections $V_{23}$, $V_{24}$, $V_{26}$ and $V_{27}$ operates in the same manner as the depth phase sensitive detector described above, with the exception that the modulating voltages applied to modulator tubes $V_5$ and $V_6$ are respectively applied to the cathode of $V_{27}$ and the plate of $V_{23}$. Consequently, the voltage across capacitor $C_{66}$, which couples the plate of $V_{24}$ and the cathode of $V_{26}$ to ground, is approximately equal to the definite integral of the output of the amplifier tube $V_{17}$ during the interval $0<\omega_2 t<\pi$, since the voltage drops across resistors $R_{68}$ and $R_{69}$ due to the modulating voltages applied to the modulator tubes $V_5$ and $V_6$ respectively, render $V_{24}$ and $V_{26}$ nonconducting during the interval $\pi<\omega_2 t<2\pi$, when the modulating voltages applied to the plate of $V_{23}$ and the cathode of $V_{27}$ are respectively positive and negative with respect to ground.

It will thus be appreciated that the voltage across capacitor $C_{66}$ is approximately equal to the voltage given by Equation 16 supra, page 36; that this voltage is proportional to the algebraic difference between the amplitudes of the voltages applied to the control grids of modulator tubes $V_5$ and $V_6$, and that the voltage across $C_{66}$ is not influenced by the voltages applied to the modulators $V_3$ and $V_4$.

More specifically, it will be appreciated from Equations 15 and 16, supra, that the voltage across $C_{64}$ will be of positive polarity when the up voltage $E_{26}$ exceeds the down voltage $E_{28}$, and conversely will be of negative polarity when the down voltage $E_{28}$ exceeds the up voltage $E_{26}$. Similarly, the voltage across condenser $C_{66}$ will be of positive polarity when the right voltage $E_{27}$ exceeds the left voltage $E_{29}$, the voltage across $C_{66}$ being of negative polarity when the left voltage exceeds the right voltage. These voltages appearing across condensers $C_{64}$ and $C_{66}$ are applied, by way of transfer relay $X_1$, through steering amplifiers, to the depth and azimuth steering rudders, respectively, to provide guidance of the torpedo in accordance with the direction of incidence of target echoes on the transducer T.

As hereinbefore set forth, the transfer relay normally connects the steering amplifiers and rudders to suitable searching controls which preferably provide horizontal and vertical guidance to the torpedo and which cause the latter to systematically search throughout the surrounding medium for a moving target. The transfer relay is actuated, in response to target echoes having the requisite characteristics, to disconnect the steering amplifiers from the searching controls and thereby interrupt the searching procedures, the transfer relay then connecting the amplifiers to the phase-sensitive detectors, whereby guidance of the torpedo is controlled by the steering voltages appearing across condenser $C_{64}$ and $C_{66}$.

For this purpose, the Doppler enabling pulse, which is produced at the output of the Doppler discriminator circuit whenever the amplitude of the target echo exceeds the magnitude of the concurrent reverberation by a predetermined amount and for a predetermined length of time, and the frequency of the target echoes differs by a predetermined amount from the frequency of the concurrent reverberation, is applied through coupling condenser $C_{67}$ to the grid of cathode follower amplifier tube $V_{28}$. The plate of $V_{28}$ is connected to a source of positive plate supply and is rendered normally non-conducting by negative grid bias $B_{11}$ applied through resistor $R_{69}$ to the grid thereof. The output of tube $V_{28}$ appears across the cathode resistor $R_{71}$, and the cathode of tube $V_{28}$ is connected by resistor $R_{72}$ to the grid of amplifier tube $V_{29}$, which grid is normally biased to cut off by the negative bias source $B_7$ applied to cathode resistor $R_{71}$.

The Doppler enabling pulse applied to the grid of tube $V_{28}$ renders the tube conducting thereby positively charging condenser $C_{68}$ which is connected between the cathode of tube $V_{28}$ and ground. The postive pulse across condenser $C_{68}$ renders the relay amplifier tube $V_{29}$ conducting, thereby energizing the relay coil $L_{17}$ of the transfer relay $X_1$ in the plate circuit thereof. The cathode of tube $V_{29}$ is connected to a suitable source of negative bias $B_8$, and the plate of tube $V_{29}$ is connected through relay coil $L_{17}$ to positive plate bias supply $B_2$. The time constant of the RC circuit comprising resistor $R_{71}$ and condenser $C_{68}$ is made such that when a Doppler enabling pulse is applied to the grid of tube $V_{28}$ the voltage generated on the grid of tube $V_{29}$ will be held sufficiently long so that the transfer relay will remain closed for a period which is relatively longer than the time between successive transmission pulses. If a succeeding Doppler enabling pluse is not received within that time, the coil $L_{17}$ is de-energized and the transfer relay then opens, whereupon the systematic target searching operations is resumed.

When the transfer relay $X_1$ is open, the depth and azimuth steering amplifiers, which are connected to terminals $S_3$ and $S_4$ thereof, respectively, are connected to the depth and azimuth searching controls through contacts $S_5$ and $S_6$, and guidance of the torpedo is provided by the azimuth and depth searching controls. However, when the transfer relay $X_1$ is closed, the depth and azimuth phase sensitive detectors which are respectively connected to contacts $S_1$ and $S_2$ are coupled to the depth and azimuth steering amplifiers and provide guidance of the torpedo in accordance with the direction of incidence of acoustic signals on the transducer T.

The depth steering amplifier includes tube $V_{31}$ having the plate thereof directly coupled to the grid of the depth relay amplifier tube $V_{32}$, the plate of tube $V_{31}$ being otherwise connected through load resistor $R_{73}$ which is bypassed to ground by condenser $C_{69}$, to a source of positive plate bias supply $B_2$. A grid bias resistor $R_{74}$ is provided in the cathode circuit of $V_{31}$ and bias is provided through a bleeder system including $R_{75}$, whereby the cathode of tube $V_{31}$ is normally maintained positive with respect to ground. The plate of amplifier $V_{32}$ is connected through the relay coil $L_{18}$ of the depth relay $X_2$ to positive plate supply $B_{10}$, the cathode of $V_{32}$ being maintained at a somewhat lower positive potential by $B_3$. When a positive "Up" pulse from the phase sensitive detectors is applied to the grid of the D.C. amplifier tube $V_{31}$ by way of contacts $S_1$, armature $S_3$ and resistor $R_{70}$, the current flow therethrough is increased, thereby increasing the voltage drop across the load resistor $R_{73}$ and rendering the grid of $V_{32}$ less positive. This causes the relay coil $L_{18}$ to become deenergized whereby the armatures $S_7$ and $S_8$ are moved to their open position shown in FIG. 10.

When the armatures $S_7$ and $S_8$ are in their open position, the armature $S_8$ engages contact $S_9$, thereby grounding the cathode of tube $V_{31}$ through the contact $S_{11}$ and armature $S_{12}$ on the transfer relay $X_1$, thereby introducing electronic hysteresis by further increasing the flow of current through tube $V_{31}$ and causing the grid of tube $V_{32}$ to become still less positive. Thus, there is effectuated a locking of the depth steering relay in its open position. Since the armature $S_{12}$ engages contact $S_{11}$ on the transfer relay $X_1$ only when the latter is closed, electronic hysteresis is introduced only when the torpedo is under the guidance of echo signals, and not when the torpedo is controlled by the depth searching controls. The holding time of the transfer relay causes the torpedo to steer in the direction of the last received echo for the duration of the holding time, which, as hereinbefore set forth, is greater than the time interval between successive pulses.

When a negative "Down" signal is applied to the grid of tube $V_{31}$, the current flow through D.C. amplifier tube $V_{31}$ is decreased, thereby raising the grid potential of tube $V_{32}$ and energizing the relay coil $L_{18}$. The depth relay is then closed, disconnecting the armature $S_8$ from contact $S_9$, the relay being so constructed as to afford iron to iron contact with the pole piece, thereby introducing large magnetic hysteresis and causing the relay to lock in its closed position.

The relay armature $S_7$ is connected to the main motor running battery, and contacts $S_{13}$ and $S_{14}$ are each connected to one terminal of a field winding in the depth steering motor which is provided with double windings to make it reversible.

The azimuth steering amplifier operates in a manner similar to that previously described in connection with the depth steering amplifier and is selectively connected by the transfer relay to the azimuth searching control and to the azimuth phase sensitive detector. The voltage across condenser $C_{66}$, which, as hereinbefore set forth, is of positive polarity when the target lies to the right of the transducer axis, and which is of negative polarity when the target lies to the left of the transducer axis, is applied through resistor $R_{76}$ to the grid of D.C. amplifier tube $V_{33}$. The output of tube $V_{33}$ appears across load resistor $R_{77}$ which is by-passed to ground by condenser $C_{71}$ and connected to a plate supply source $B_2$, which output is directly applied to the grid of azimuth relay amplifier tube $V_{34}$. A bias resistor $R_{78}$ is provided in the cathode circuit of tube $V_{33}$, grid bias being provided by a bleeder system including resistor $R_{79}$ which is connected to the plate bias supply $B_2$. The plate of tube $V_{34}$ is connected through relay coil $L_{19}$ of the azimuth steering relay $X_3$ to plate supply source $B_{10}$, the cathode being maintained at a relatively lower positive potential by $B_3$.

When a positive "Right" pulse is applied to the grid of tube $V_{33}$, the depth steering relay $X_3$ is deenergized, thereby causing the armature $S_{15}$ to engage contact $S_{16}$ and ground the cathode of tube $V_{33}$ through the contact $S_{17}$ and armature $S_{18}$ of the transfer relay, thereby introducing electronic hysteresis and locking the azimuth steering relay in its open position. Conversely, when a negative pulse is applied to tube $V_{33}$, the azimuth steering relay $X_3$ is energized, the latter locking in its closed position due to the iron to iron contact of the armature with the pole piece. The armature $S_{19}$ is connected to the main motor battery, the contacts $S_{21}$ and $S_{22}$ being connected to the differential windings on the azimuth steering motor to actuate the latter in relatively opposite directions dependent on the sense of the voltages across condenser $C_{66}$.

Alternatively, the azimuth steering motor may be controlled solely in response to the azimuth steering signals appearing across condenser $C_{66}$ in which case the grid of tube $V_{33}$ would be constantly connected to the azimuth phase sensitive detectors, instead of through the transfer relay $X_1$, and the armature $S_{15}$ would be connected directly to ground. Under these conditions, the torpedo, prior to the reception of a target echo which would produce a suitable Doppler enabling pulse, would be steered in azimuth in accordance with direction of the last target echo received, the azimuth relay being locked in either its open or closed position by the steering signals appearing across $C_{66}$, as hereinbefore set forth.

DOPPLER ENABLING CIRCUITS

As hereinbefore set forth, the automatic gain control system employed in the quadrature receiver amplifier tends to maintain the average amplitude of the receiver amplifier output voltage constant during the reception of reverberation, but does not appreciably alter the gain of the receiver during the reception of echoes of high intensity and short duration. The automatic gain control system does not, however, respond instantaneously to the high intensity reverberation signal which immediately follows transmission, but rather has a finite response time during which the reverberation signal at the receiver output will be appreciably greater than during the remainder of the listening period. This response time of the automatic gain control system is referred to as the reverberation sampling period.

The output of the 7 kc. band pass filter $T_6$ is also applied, through resistor $R_{81}$ across grid leak resistor $R_{82}$ to the grid of amplifier tube $V_{36}$. A bias resistor $R_{83}$ is provided in the cathode circuit of tube $V_{36}$, the output of the amplifier appearing across plate load resistor $R_{84}$ which is connected to a suitable plate supply source $B_2$. The output of the amplifier tube $V_{36}$ is applied, through condenser $C_{72}$ across resistor $R_{86}$, to the plate of diode rectifier tube $V_{37}$, the output of which appears across resistor $R_{87}$. The voltage appearing across resistor $R_{87}$ is applied through RC filter comprising resistor $R_{88}$ and condenser $C_{73}$ to the grid of amplifier tube $V_{38}$, the filter preventing operation of the tube $V_{38}$ on short, sharp spikes, of noise. The plate of tube $V_{38}$ is connected through resistor $R_{89}$ to a source of positive plate supply, the tube being normally cut off by the bleeder system comprising resistors $R_{91}$ and $R_{92}$ which are also connected to the positive plate supply $B_2$. Thus, the plate voltage of tube $V_{38}$ is normally that of full plate supply, the plate of $V_{38}$ being directly coupled across condenser $C_{75}$ through resistor $R_{93}$ to the cathode of diode switch tube $V_{39}$. The plate of tube $V_{39}$ is returned, through resistor $R_{94}$ to a potential divider comprising resistors $R_{95}$ and $R_{96}$, the latter being by-passed to ground by condenser $C_{74}$, which potential divider is connected to the plate supply and maintains the plate of tube $V_{39}$ at approximately 85% of the plate supply. When tube $V_{38}$ is rendered conducting during an echo, the cathode potential of $V_{39}$ is reduced, and current flows through the diode $V_{39}$, whereby the latter serves as an electronic switch.

The output of the 7 kc. band pass filter is also applied, through resistor $R_{97}$ condenser $C_{76}$ to the cathode of tube $V_{39}$, and when the latter is rendered conducting, in the manner hereinbefore set forth, the 7 kc. signal is passed by the diode. The filter comprising resistor $R_{88}$ and condenser $C_{73}$ has a time constant such that the tube $V_{38}$, and consequently switch tube $V_{39}$ remain non-conducting unless the echo signal persists for a predetermined time such as 5 milliseconds. Further, the echo to reverberation ratio which is necessary to render tube $V_{39}$ conducting is determined by the voltage divider comprising resistors $R_{95}$ and $R_{96}$, and by suitable design thereof, the tube $V_{39}$ is rendered conducting only when the echo to reverberation ratio exceeds a predetermined value.

When the electronic switch tube $V_{39}$ is rendered conducting, the 7 kc. signal is applied, through condenser $C_{77}$, across resistor $R_{98}$, through resistor $R_{99}$ to the grid of the 7 kc. tuned amplifier tube $V_{41}$. The plate load of amplifier $V_{41}$ includes resistor $R_{101}$, condenser $C_{78}$, and inductor $L_{21}$ which is connected to a suitable source of plate supply potential, which circuit is antiresonant at the frequency of 7 kc., whereby the amplifier tends to remove the harmonic distortion in the signal produced by the non-linear action of the diode switch $V_{39}$ and the amplifier tube $V_{41}$. The screen grid of tube $V_{41}$ is by-passed to ground by condenser $C_{79}$ and is connected through resistor $R_{102}$ to the plate supply source $B_2$, grid bias for tube 41 being afforded by cathode resistor $R_{103}$. The electrode potentials for this tube are chosen such that the maximum output voltage obtainable from the tube occurs when the output voltage of the quadrature receiver amplifier is just sufficient to make diode $V_{39}$ conduct, whereby the tube $V_{41}$ acts as a limiter so that the output of the discriminator, to be described more fully hereinafter, is a function of frequency only.

The output of amplifier-limiter tube $V_{41}$ is applied through coupling condenser $C_{81}$ across grid resistor $R_{104}$, and through resistor $R_{105}$ to the grid of amplifier $V_{42}$ having a grid bias resistor $R_{100}$ in the cathode circuit thereof. The output of amplifier tube $V_{42}$ is applied to mutually coupled inductors $L_{22}$, $L_{23}$ and $L_{24}$, condensers $C_{82}$, $C_{83}$, $C_{84}$, $C_{85}$ and $C_{86}$, resistors $R_{106}$, $R_{107}$ and $R_{108}$ and diode tubes $V_{42}$ and $V_{43}$ which form a frequency discriminator. The discriminator, as is conventional, produces an output voltage across resistors $R_{107}$ and $R_{108}$, the instantaneous value of which is proportional to the algebraic difference between the frequency of the signal applied to the discriminator and the characteristic frequency of the discriminator, the latter frequency being made equal to the frequency at which the plate load impedance of amplifier-limiter tube $V_{41}$ is anti-resonant.

As hereinbefore set forth, the speed of the torpedo will vary throughout its course, and since it is contemplated that the torpedo steer only in response to the Doppler shift introduced in the echo signal due to a moving target, it is necessary to eliminate the Doppler due to the torpedo. For this purpose the output of the discriminator is applied during the hereinbefore mentioned reverberation sampling period to a reactance tube which controls the frequency of the 53 kc. oscillator to thereby correct the 7 kc. reduced signal frequency to the characteristic frequency of the discriminator. The output of the discriminator is applied, through a voltage divider comprising resistors $R_{109}$ and $R_{111}$, through resistor $R_{112}$ to the armature $S_{23}$ of the own Doppler nullification relay $X_4$, referred to as the ODN relay. Whenever the ODN relay is closed, in a manner to be described hereinafter, the armature $S_{23}$ engages contact $S_{24}$, whereby the output of the discriminator is applied to the grid of the reactance tube $V_{44}$ and to condenser $C_{87}$ which holds the proper charge between ODN sampling intervals.

The oscillator tube $V_{45}$ has a tank circuit including a center-tapped inductor $L_{25}$ connected to the cathode thereof and tuning condensers $C_{88}$ and $C_{89}$, one side of which tank circuit is grounded as at 44. The other side of the tank circuit is connected by resistor $R_{113}$ and condenser $C_{91}$ to the grid of the oscillator tube $V_{45}$ and, through condenser $C_{92}$ and the plate-cathode path of the variable reactance tube $V_{44}$ through resistor $R_{114}$ to ground, whereby condenser $C_{92}$ may be shunted with varying degrees of rigor across the main tuning condensers $C_{88}$ and $C_{89}$. As the grid potential of the reactance tube $V_{44}$ is changed, the effective resistance between condenser $C_{92}$ and ground is varied, thereby varying the effective capacitance of $C_{92}$ in the oscillator tank circuit. The plate supply source $B_2$ is connected through resistor $R_{115}$ to the plate of oscillator tube $V_{45}$ and to condenser $C_{93}$ and through the plate-cathode path of the diode-connected tube $V_{46}$ to the plate of the variable reactance tube $V_{44}$, which diode-connected tube provides a substitute for the large inductance or resistance which would otherwise be necessary to isolate condenser $C_{92}$ from the plate supply. The tube $V_{46}$ conducts during a small portion of the oscillator cycle, and during the rest of the cycle the reactance tube obtains its current from the charge placed on $C_{92}$ during the diode conducting period.

Thus, the output of the discriminator is applied to the reactance tube to vary the effective capacitaince of $C_{92}$ in shunt with the oscillator tank circuit and thus vary the frequency of the oscillator in accordance therewith, the circuits being adjusted so that the reduced signal frequency of the center signal at the receiver amplifier output is corrected during the reverberation sampling period so as to be equal to the characteristic frequency of the discriminator, the condenser $C_{87}$ serving to maintain the corrected oscillator frequency during the intervals between the reverberation sampling period. Thus, the output of the discriminator is zero in response to reverberation echoes received during the reverberation sampling period. However, when a target echo is received after the reverberation sampling period, the oscillator frequency is not changed in response thereto, and the discriminator output is therefore a voltage dependent on the Doppler due to the component of the target velocity relative to the surrounding medium which is parallel to the torpedo axis.

In order for the amplitude gate to pass the reverberation signal during the initial portion of the listening period and correct the local oscillator for the Doppler of the torpedo, it is necessary that the automatic volume control be disabled during the reverberation sampling period. For this purpose, the AVC output appearing across condenser $C_{44}$ (FIG. 5) is shorted through armature $S_{25}$ and contact $S_{26}$ to ground, when the ODN relay is closed.

The negative pulse generated in the transmitter during transmission is differentiated in condenser $C_{94}$ and $R_{116}$ and the resultant positive pulse at the end of transmission is applied through resistor $R_{117}$ to the grid of the cathode follower tube $V_{47}$. This tube has its plate connected to a source of positive plate supply $B_2$ and its cathode connected through resistor $R_{118}$ to a negative bias supply $B_7$, the tube being normally cut off by the negative bias $B_6$ applied to the grid through resistor $R_{116}$. The positive differentiated pulse applied to the grid of $V_{47}$ renders the latter conducting thereby positively charging condenser $C_{95}$, the voltage across the condenser $C_{95}$ being applied through resistor $R_{119}$ to the grid of relay amplifier tube $V_{48}$. The cathode of relay amplifier tube $V_{48}$ is connected to a negative bias supply source $B_8$, and the plate thereof is connected through the relay coil $L_{26}$ to plate supply $B_2$, whereby when the tube $V_{48}$ is rendered conducting by the positive pulse appearing across condenser $C_{95}$, the coil $L_{26}$ is energized, thereby closing the relay. The time constant of resistor $R_{118}$ and condenser $C_{95}$ is chosen such that the positive pulse will be maintained on the grid of tube $V_{48}$ for the requisite interval, viz. the reverberation sampling period.

When the torpedo is slowly approaching a target, a time will be reached when the target echo falls within the reverberation sampling period, and the reactance tube would consequently start to correct to the echo frequency, and loss of contact with the target would result. $V_{49}$ is used to disable the ODN system whenever signals above a predetermined level are delivered by the transducer T during the ODN sampling period. A signal from the output of the first stage of the common amplifier (FIG. 5) is applied through condenser $C_{96}$ and resistor $R_{121}$ across grid resistor $R_{122}$ of the grid of tube $V_{49}$. A biasing resistor $R_{123}$ is provided in the cathode circuit of high frequency amplifier $V_{49}$ and the plate is coupled through load resistor $R_{124}$ to a source of positive plate supply $B_2$. The output of tube $V_{49}$ is applied through coupling condenser $C_{97}$ to the grid of relay amplifier tube $V_{48}$ and disables the relay amplifier by lowering its average plate current with high level 7 kc. overload which causes distorted 7 kc. plate current, whenever high level signals are received by the transducer such as would result when the torpedo reaches a predetermined condition of proximity to a target. Thus, if a high level signal from a moving target is received during the reverberation sampling period, the ODN relay is disabled, thereby preventing the reactance tube from correcting on the frequency of the target echo.

The output of the frequency discriminator is also applied to a low-pass multiple stage RC filter comprising resistors $R_{125}$, $R_{126}$ and $R_{127}$ and condenser $C_{98}$, $C_{99}$, $C_{101}$ and $C_{102}$. The low-pass filter is designed to attenuate pulses of the discriminator output voltage, the duration of which is short compared to the duration of a pulse resulting from the echo of a transmitted signal. Such pulses may be expected to appear at the output of the frequency discriminator as a result of noise pulses and rapid fluctuations of the frequency of reverberation together with changes of intensity of sufficient magnitude and rapidity that the automatic gain control of the receiver amplifier is ineffective in suppressing them. The time constant of the discriminator filter adds to the time constant incorporated in the amplitude gate since it is impossible for the discriminator filter to start to build up until after the signal has begun to pass the amplitude gate. The minimum duration of the transmission must therefore be greater than the sum of these time constants in order to operate the echo ranging system.

Since the shape of the pulse envelope emitted by the transmitter produces a certain frequency spread in the transmitted frequency and since all reverberation is not received from points on the transducer axis, the reverberation will contain a certain range of frequencies. It is, therefore, necessary to impose the condition that the Doppler shift in frequency caused by the motion of the target be greater than a certain value in order to avoid enabling of the system because of frequency components which are present in the reverberation. For this purpose there is employed a Doppler gate which produces an output signal only when the input voltage from the discriminator corresponding to a predetermined frequency differential from the frequency of the concurrent reverberation, is received.

The output of the discriminator filter which appears across condenser $C_{102}$ is applied through resistors $R_{128}$ and $R_{129}$ to the Doppler gate including diodes $V_{51}$ and $V_{52}$ respectively. The plate of $V_{51}$ is connected through resistor $R_{131}$ to a negative bias supply $R_4$, and the cathode of tube $V_{52}$ is maintained positive with respect to its plate by a source of positive bias supply $B_5$. The amount of voltage delay incorporated in the Doppler gate may be varied by changing the value of $R_{131}$.

The positive or negative pulses produced at the output of the Doppler gate in response to applied signals having sufficient frequency shift to overcome the delay gate will pass either the rectifier $V_{51}$ or $V_{52}$, depending on the polarity thereof and, appear across resistor $R_{132}$ and condenser $C_{103}$ are applied to the grid of $V_{53}$. As is conventional, a bias resistor $R_{133}$ is provided in the cathode circuit of $V_{53}$ and the plate thereof is coupled through load resistor $R_{134}$ to the plate supply source $B_2$. If the pulse supplied to the grid of tube $V_{53}$ is negative, a positive pulse will be generated at the plate of $V_{53}$ and be passed through condenser $C_{104}$ and diode rectifier tube $V_{54}$. If, the pulse applied to the grid of $V_{53}$ is a positive pulse, the pulse at the plate thereof will be a negative pulse which cannot pass the diode $V_{54}$, but will be applied through resistor $R_{130}$ to the grid of phase inverter tube $V_{55}$. Plate bias from source $B_2$ is applied to tube $V_{55}$ through resistor $R_{134}$ and grid bias is afforded by the bleeder system including resistors $R_{135}$ and $R_{136}$, the output of $V_{55}$ being 180° out of phase with the input. The output of inverter tube $V_{55}$ is applied through condenser $C_{105}$ to the plate of diode $V_{56}$ and is passed therethrough. Diodes $V_{54}$ and $V_{56}$ are normally maintained non-conducting by a negative bias applied to the plates thereof through resistors $R_{137}$ and $R_{138}$, the combined outputs of the diode rectifiers $V_{54}$ and $V_{56}$ appearing across resistor $R_{139}$ being a voltage having the same positive polarity, independent of the polarity of the pulse signal output of the discriimnator.

The resultant effect of the Doppler gate and phase inverter is such that the voltage across resistor $R_{139}$ is zero for a pulse of either polarity and of magnitude less than a predetermined value at the output of the low pass filter, but for a pulse of either polarity and of magnitude greater than a predetermined value at the output of the low pass filter, a positive pulse with respect to ground appears across resistor $R_{139}$.

The voltage across resistor $R_{139}$ and the negative bias from source $B_9$ are applied in series through resistor $R_{58}$ to the grid of the Doppler switch tube $V_{16}$ (FIG. 5), and serve as grid bias for this tube. In the absence of a positive pulse across resistor $R_{139}$, the voltage across the negative bias source biases the grid of switch tube $V_{16}$ sufficiently to cut off the flow of plate current with the result that no alternating voltage signal is applied to the phase sensitive detectors and steering amplifiers. In the presence of a positive pulse across resistor $R_{139}$ the bias applied to the grid of $V_{16}$ is less negative with the result that the signal applied to the grid of $V_{16}$ is amplified and passed therethrough.

The Doppler enabling pulse is also applied through an RC delay circuit comprising resistor $R_{140}$ and condenser $C_{106}$, through condenser $C_{67}$ to the grid of cathode follower $V_{28}$ (FIG. 10), thereby closing the transfer relay $X_1$ and applying the output of the phase sensitive detectors to the steering amplifiers, as hereinbefore set forth.

TRANSMITTER

Figure 9:
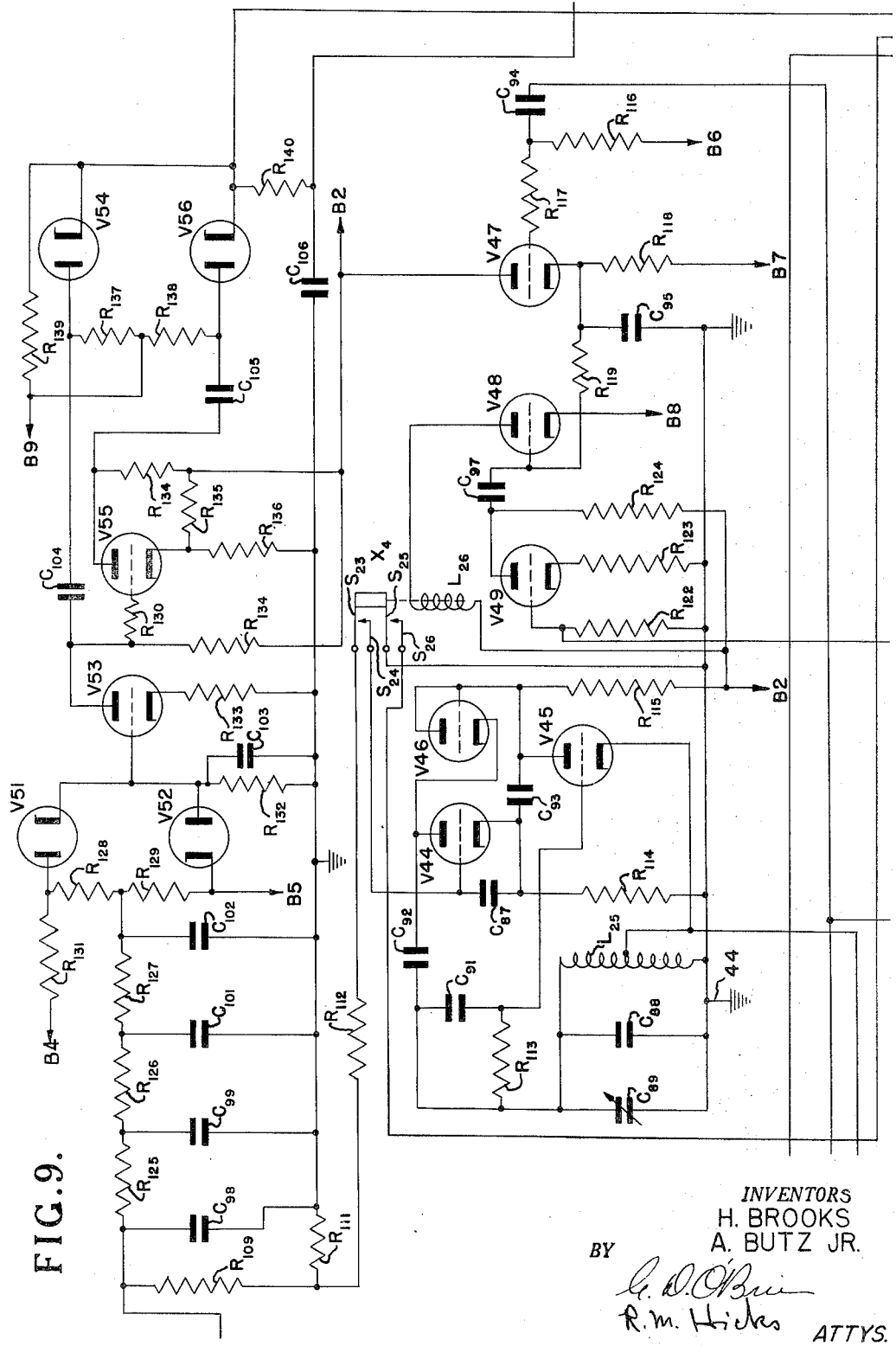
FIG. 9 is a schematic diagram of the final portion of the Doppler enablement channel and including the Doppler gate and own Doppler nullification circuits.

The time base for the echo ranging system is provided by a multivibrator comprising tubes $V_{57}$ and $V_{58}$ which have the plates thereof connected through resistors $R_{14}$ and $R_{142}$, respectively, to a plate supply source $B_{12}$. The plate of $V_{67}$ is coupled by way of condenser $C_{107}$ and resistors $R_{143}$ and $R_{144}$ to the grid of tube $V_{58}$, the plate of $V_{58}$ being coupled by way of condenser $C_{108}$, resistors $R_{145}$ and $R_{146}$ and condenser $C_{109}$ to the grid of $V_{57}$, resistor $R_{146}$ and condenser $C_{109}$ being incorporated to provide protection from high-level electrical noise which would otherwise produce irregular operation of the pulser. Similar protection is not required at the grid end of $R_{144}$ since tube $V_{58}$ is normally non-conducting and is consequently insensitive to stray electrical signals. Resistor $R_{141}$ and condenser $C_{107}$ determine the pulse repetition rate and resistor $R_{145}$ and condenser $C_{108}$ determine the pulse duration. The pulse generated by the multivibrator is a negative pulse and is applied by way of resistor $R_{147}$ and condenser $C_{111}$ to the suppressor grids of common channel amplifier tubes $V_{11}$ and $V_{12}$ (FIG. 5), to prevent operation of the amplifier during transmission, the negative pulse also being applied to the ODN relay (FIG. 9) to operate the latter, as hereinbefore set forth.

The negative multivibrator pulse is also applied through condenser $C_{112}$ across grid resistor $R_{148}$ to the grid of phase inverter tube $V_{59}$, which tube has its plate connected through load resistor $R_{149}$ to plate supply source $B_2$. The output of the phase inverter is a positive pulse which is utilized to actuate the transmitter.

Tube $V_{61}$ is the transmitting oscillator and includes a tank circuit comprising a center-tapped inductor $L_{28}$ and condensers $C_{113}$ and $C_{114}$, the tap on the inductor being connected by resistor $R_{151}$ to the cathode of $V_{61}$ and one side of the tank circuit being connected by way of condenser $C_{115}$ to the grid of $V_{61}$. The plate of tube $V_{61}$ is connected to a source of positive plate supply $B_2$, and by-passed to ground by condenser $C_{119}$, the tube being normally maintained non-conducting by negative bias $B_{13}$ applied through resistors $R_{152}$ and $R_{153}$ to the grid thereof. During the transmission period, the negative voltage on the grid $V_{61}$ is bucked by the positive pulse from the inverter tube $V_{59}$ which is applied by way of condensers $C_{116}$ and $C_{117}$ and resistors $R_{154}$ and $R_{152}$ to the grid of $V_{61}$.

The output of the oscillator is applied through condenser $C_{118}$ to the grid of buffer amplifier tube $V_{62}$ which provides isolation between the oscillator and the driver stage. Plate potential $B_2$ is applied to $V_{62}$, the load comprising resistors $R_{155}$ and $R_{156}$ being provided in the cathode circuit thereof, and grid bias being afforded by the connections between the junction of resistors $R_{155}$ and $R_{156}$ through resistor $R_{157}$ to the grid of $V_{62}$.

The output of cathode-follower amplifier appearing across load resistors $R_{155}$ and $R_{156}$ is applied through condenser $C_{121}$ to the grid of driver amplifier tube $V_{63}$, the latter having a tuned plate load comprising inductor $L_{28}$ having a center-tap thereon connected to the plate supply $B_{14}$ and condenser $C_{122}$ which forms the primary of transformer $T_8$, and a grid bias circuit including resistor $R_{158}$ and condenser $C_{123}$ in the cathode circuit thereof. The driver amplifier is normally maintained non-conducting by the negative bias $B_{13}$ applied through resistors $R_{159}$ and $R_{161}$ to the grid thereof, and during transmission the positive pulse from the phase inverter tube $V_{59}$ is applied through resistors $R_{162}$ and $R_{161}$ in opposition to the bias to render the driver amplifier conducting. The output of the driver amplifier apearing across indicator $L_{29}$ which forms the secondary of transformer $T_8$ is utilized to provide the driving power to operate the class C output stage. Since a considerable amount of grid current is drawn by the output amplifier tubes $V_{64}$, $V_{65}$, $V_{66}$ and $V_{67}$ during a portion of each cycle, the transformer $T_8$ is tuned to accumulate energy during most of each cycle, thus assisting the driver amplifier tube $V_{63}$ in delivering the peak grid current required. Since the output amplifier tubes draw grid current during transmission, it will be appreciated that the output impedance of the transmitter during transmission is less than the output impedance when not transmitting.

One side of the secondary of transformer $T_8$ is connected by resistors $R_{163}$ and $R_{164}$ to the grids of tubes $V_{64}$ and $V_{65}$ respectively, the other side of the secondary being connected by resistors $R_{165}$ and $R_{166}$ to the grids of tubes $V_{66}$ and $V_{67}$ respectively. The control grids of tubes $V_{64}$, $V_{65}$, $V_{66}$ and $V_{67}$ are operated at a large negative bias $B_{13}$ applied to the center-tap on the secondary of transformer $T_8$ to reduce battery drain to a minimum, and to minimize thermal noise which would be generated in the transmitter if an appreciable amount of plate current were permitted to flow during the listening intervals. Noise generated in such fashion would be sufficient to limit the maximum receiver sensitivity. Positive bias from source $B_{12}$ is applied to the screen grids of amplifiers $V_{64}$ and $V_{65}$ through resistor $R_{167}$ and through resistor 168 to the screen grids of tubes $V_{66}$ and $V_{67}$, the plates of $V_{64}$ and $V_{65}$ being connected to one side of transformer primary winding $L_{3a}$ of transformer $T_3$ the plates of tubes $V_{66}$ and $V_{67}$ being connected to the other side of primary winding $L_{3a}$ (FIG. 3).

Recapitulating, during transmission energy pulses are supplied by the transmitter to the primary $L_{3a}$ of transformer $T_3$, energy from the secondary windings $L_{3b}$ and $L_{3c}$ being applied to the primary windings $L_{1a}$, $L_{1b}$, $L_{2a}$ and $L_{2b}$ of transformers $T_1$ and $T_2$ to the quadrantal elements of the transducer, whereby quadrants 1 and 3 are energized 180° out of phase with quadrants 2 and 4, and all elements vibrated in phase. Since the primary windings $L_{1a}$ and $L_{1b}$ of transformer $T_1$ and the primary windings $L_{2a}$ and $L_{2b}$ of transformer $T_2$ are energized in phase opposition during transmission, negligible power loss is incurred in the receiving circuits connected to the secondaries of transformers $T_1$ and $T_2$, and it is consequently not necessary to disconnect the receiver during transmission.

During reception, voltages are induced in the quadrantal elements of the transducer T. When the sound source S is located on the transducer axis, the voltages in quadrants 1 and 3 are in phase with each other, and the voltages in quadrants 2 and 4 are in phase with each other and in phase opposition with the voltages induced in quadrants 1 and 3. As the sound source S becomes displaced from the transducer axis, the voltages in diagonally opposite quadrants become phase shifted relative to each other, the voltages induced in the quadrants near the sound source being advanced in phase and the voltages induced in the quadrant farther from the sound source being retarded.

The voltages being applied between terminals 12, 13 of the secondary transformer $T_3$ and ground are derived from the diagonal transducer pairs operating in series aiding and, due to the close coupling between the windings $L_{3b}$ and $L_{3c}$, the voltage across $L_{3c}$ is proportional to the vector sum of the voltages in the transducer diagonals. Since the transmitter is chosen to be of the type wherein the output impedance is much greater when the transmitter is not operating than when the transmitter operates, and as the transformer $T_3$ is designed to match the impedance of the transmitter to that of the transducer during transmission, it is deemed apparent that the impedance mismatch which exists between the transmitter and transducer during reception insures that negligible power will be lost in the transmitter under those conditions. Thus it is not necessary to disconnect the transmitter during reception.

The transformers $T_1$ and $T_2$, in addition to affording a convenient means for connecting a receiver circuit to the transducer in such a manner as to obviate the necessity of disconnecting the receiver during the transmission, also provide the necessary step-up ratio to match the relatively low impedance of the transducer to that of the receiver and further provides for the production of voltages proportional to the vector differences between the voltages in diagonally opposite quadrants. These bucking voltages between diagonals are combined with a voltage $E_{cl}$, proportional to the voltage appearing across the winding $L_{3c}$ of transformer $T_3$, and shifted 90° in phase relative thereto, whereby there are produced four voltages appearing at terminals 19, 20 22 and 23, the amplitude of which is indicative of the sense of the bucking voltage between diagonally opposite guadrants. For example, when the bucking voltage between diagonally opposite quadrants 1 and 3 is in phase with the voltage $E_{cl}$, the potential at terminal 19 is increased above $E_{cl}$, by an amount dependent on the phase difference between the voltages induced in quadrants 1 and 3. Similarly, the potential of terminal 20 will be reduced by an equal amount below $E_{cl}$ since the bucking voltage between the quadrants 3 and 1, under the above conditions, will be 180° out of phase of the voltage $E_{cl}$. Thus, the pairs of voltages appearing at terminals 19, 20, 22 and 23 will either be greater or less than the voltage $E_{cl}$, by an amount dependent on the sense of the phase difference between diagonals.

The bridge network is so connected to the secondaries of transformers $T_1$ and $T_2$ as to produce output signals at the four center-taps of the bridge legs, which signals are averages of each of the control voltages appearing at terminals 19 and 20 and each of the voltages appearing at terminals 22 and 23. Thus, the amplitude of each of the voltages appearing at terminals 26, 27, 28 and 29 is dependent on the relative amplitudes of the pair of control voltages applied to the corresponding leg of the bridge network.

It is deemed apparent from the Equations 6–9 that the averages of the control voltages appearing at terminals 26, 27, 28 and 29 are linear combinations of the voltages $E_{cl}$ with the bucking voltages between either upper and lower halves or right and left halves of the transducer. Consequently, the relative amplitudes of the voltages at terminals 26 and 28 are dependent on the sense of the bucking voltages between the upper and lower halves, while the relative amplitudes of the voltage appearing at terminals 27 and 29 are dependent on the sense of the bucking voltages between the right and left halves.

The four output signals $E_{26}$, $E_{28}$, $E_{27}$ and $E_{29}$, thus have a common frequency of 60 kc., and vary in amplitude in accordance with the direction of incidence of the incoming signals on the transducer T. These output voltages are modulated by suitable phased voltages produced in the oscillator $V_7$, and phase-shift amplifier $V_8$, the signals $E_{26}$ and $E_{28}$ being modulated 180° out of phase with each other, and the signals $E_{27}$ and $E_{29}$ being modulated 180° out of phase with each other and in phase quadrature with the voltages $E_{26}$ and $E_{28}$. The resultant modulation envelope produced by combining all of the modulated voltages, given by Equation 14 supra page 35, thus includes two components in quadrature, viz:

$$(E_{26}-E_{28}) \cos \omega_2 t + (E_{27}-E_{29}) \sin \omega_2 t$$

Which quadrature components carry the intelligence of the input signals. More specifically, the component $\cos \omega_2 t$ is modulated with the differential between the vertical output signal and the component $\sin \omega_2 t$ is modulated with the differential between the horizontal output signals from the input circuits.

After amplification, the resultant modulated voltages are applied to a detector comprising tube $V_{16}$ and the associated circuits whereby the quadrature component of the resultant modulation voltage, given by the above equation, are applied to the phase-sensitive detectors.

The phase-sensitive detectors are synchronized with the modulators by the phase voltages, and rendered nonconducting during the proper portion of the switching cycle whereby the output of the detectors are voltages which vary in amplitude and phase in accordance with the relative amplitudes of the input signals. More specifically, the depth phase-sensitive detector is rendered sensitive only during the interval $$-\frac{\pi}{2}<\omega_2 t<\frac{\pi}{2}$$

during which interval the average of the component of the resultant modulated voltage which carries the depth intelligence is proportional to the difference in the up and down signals, and the average of the component of the resultant modulated voltage which carries the azimuth intelligence is zero, since the sine during this interval is as often negative as positive. Conversely, the horizontal phase-sensitive detector of rendered sensitive only during the interval $0<\omega_2 t<\pi$, during which interval the component of the resultant modulated voltage which carries the depth intelligence in zero, since the cosine during this interval is as often negative as positive, and the average of the component which carries the azimuth intelligence is proportional to the difference in the right and left voltages.

Thus, the voltages appearing across the capacitors $C_{64}$ and $C_{66}$ vary in amplitude and phase correlative with the magnitude and sense of the vector difference in the depth and azimuth input signals.

The quadrature receiver thus effects amplification of the up, down, right and left steering signals in a single channel and preserves the steering intelligence contained relative amplitudes thereof. Further, the receiver effects comparison of the relative amplitudes of the right and left signals, and the relative amplitudes of the up and down signals and produces output voltages having amplitudes and polarities correlative with greater signal, which output voltages effectuate steering of the torpedo when the latter is under acoustic control.

Since constant electrical connection is afforded between the input circuits, the transmitter and the receiver during reception, a negative blanking pulse from the pulse generator comprising tubes $V_{57}$ and $V_{58}$, and the associated circuits are applied to the suppressor grids of amplifier tubes $V_{11}$ and $V_{12}$ which form the common channel amplifier. Thus, the common channel amplifier will not pass signals from the modulators to the phase-sensitive detectors during transmission periods.

The center signal produced by the input circuits is applied to the frequency converter $V_9$ the output of which is a voltage correlative with the center voltage, but at a reduced frequency of 7 kc. The 7 kc. voltage is applied to the common channel amplifier, together with the hereinbefore mentioned resultant modulated voltage, the center signal being separated at the output of the common channel amplifier and supplied to the automatic volume control circuits including tubes $V_{14}$ and $V_{15}$ which serve to hold the slowly varying incoming signals to the common channel amplifier below a given threshold value which may be exceeded a rapid increase in level, such as would be produced by an echo.

The AVC circuits are also utilized to apply compression to the common channel amplifier through resistor $R_{53}$ to prevent smoothing out of the resultant modulated voltage as a result of overloading of the amplifier due to high intensity signals. Additionally, $V_{15}$ is utilized to short $R_{49}$ in response to a decay in the level of the amplifier output to thereby prevent the blanking of a target echo which immediately follows high level reverberation signals. The 7 kc. signal is further aplied to an amplitude gate which passes the signal only when the amplitude thereof exceeds the amplitude of the concurrent reverberation by a predetermined amount, and for a predetermined minimum length of time. The output of the amplitude gate is applied to a frequency discriminator which produces an output voltage having amplitude and polarity correlative with the frequency difference of the applied voltage, and the characteristic frequency of the discriminator.

Since it is contemplated that the torpedo steer only on targets which are moving relative to the surrounding medium, the output of the frequency discriminator is applied through the ODN relay for a predetermined interval following each transmission, and hereinbefore referred to as the reverberation sampling period, to the reactance tube which controls the frequency of the local oscillator which, in conjunction with the converter, produces the 7 kc. center signal. The circuitry is such that the output of the discriminator acting upon the reactance tube varies the oscillator frequency in such a manner that the frequency of the output of the converter is made equal to the characteristic frequency of the discriminator during the reverberation sampling period, the AVC circuits are disabled by the operation of the ODN relay during that period. Thus, the output of the frequency discriminator during the reverberation sampling period is corrected to zero, the corrected frequency being maintained by condenser $C_{87}$ and resistor $R_{114}$ which maintain the proper charge on the grid of the reactance tube $V_{44}$. In this manner, the effect of variations in frequency of the received signal, due to changes in speed of the torpedo between transmission pulses, is nullified.

The output of the frequency discriminator is also applied to a Doppler gate which produces a Doppler enabling pulse, of constant polarity, whenever the frequency of the incoming signal received by the transducer differs by a predetermined amount from the concurrent frequency of reverberation, which Doppler enabling pulse is applied to the hereinbefore mentioned Doppler switch which passes the resultant modulated voltage from the common channel amplifier to the phase sensitive detectors. Additionally, the Doppler enabling pulse is applied to the transfer relay amplifiers $V_{28}$ and $V_{29}$, thereby disconnecting the azimuth and depth steering rudders, from the respective searching controls, and applying the output of the azimuth and depth phase-sensitive detectors to the respective steering amplifiers. These amplifiers have characteristics such that the steering relays actuated thereby will be held in the direction of the last received signal.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. In a guided device, the combination comprising programmed search control means operable to guide said device in a predetermined target search pattern, an echo-ranging system having means for deriving guidance signals from target echo signals, means providing an enabling signal in response to an echo of predetermined magnitude received from a target moving at a predetermined velocity within the effective volume searched, means for interrupting guidance in said search pattern when said enabling signal is produced, and means controlled by said enabling signal to be responsive to said guidance signals for guiding said device toward the target from which said echo signals are received.

2. In a guided device, the combination comprising a pulse-echo ranging system having a pulsed transmitter, a receiver responsive to a target echo to yield quadrantal output signals in accordance with target location and a further output signal insensitive to the quadrantal position of said target, means for sampling said quadrantal output signals and for combining the samplings to provide a single-channel coded signal, means for hetrodyning said further output signal, a first amplifier for both the coded and hetrodyned signals, means disabling said first amplifier during the transmission pulse, a second amplifier for said hetrodyned signal operable in response to signals of predetermined magnitude, a frequency discriminator for the amplified hetrodyned signals, means connected to the output of said discriminator for a predetermined interval after said transmission pulse and operable to vary the hetrodyne frequency to a value corresponding to the center frequency of said discriminator, a second amplifier for said coded signals, means responsive to a discriminator echo signal of predetermined magnitude for rendering the coded signal second amplifier operative, means for decoding the output of the coded signal second amplifier and for providing steering signals therefrom, searching control means for said device, steering control means responsive to said steering signals to guide said device in the direction of said target, and means responsive to said discriminator echo signal of predetermined magnitude for transferring guidance of said device from said searching control means to said steering control means.

3. An echo ranging device comprising transducer means for producing signals having relative phase relations correlative with the direction of incidence thereon of wave energy arriving as a target echo, means responsive to said signals for producing output voltages having relative amplitudes correlative with the phase relations between said signals, means for sampling said output voltages in time sequence and for combining the samplings in a single channel to produce a resultant voltage having amplitude and phase characteristics correlative with said direction, normally inoperative amplifying means for amplifying said resultant voltage, means for rendering said amplifying means operative in response to the reception of wave energy having predetermined amplitude and frequency characteristics different from the wave energy due to reverberation from the surrounding medium, and means for detecting the amplitude and phase of the amplified resultant voltage and for producing steering signals correlative therewith.

4. An echo ranging system comprising transducer means for producing signals having relative phase relations correlative with the direction of incidence thereon of wave energy arriving as a target echo, means responsive to said signals for producing pairs of output voltages having relative amplitudes correlative with the target bearing in azimuth and depth and a pilot signal having an amplitude correlative with the intensity of the wave energy incident on the transducer means, means for amplitude modulating each of said output voltages in progressive 90° phase relation, means for combining the modulated voltages to produce a resultant voltage modulation having quadrature components correlative with the relative amplitudes of said output voltages, converter means for reducing the frequency of the pilot signal, common amplifier means for amplifying the resultant voltage and the reduced frequency pilot signal, and phase-sensitive detector means for separating said quadrature components.

5. An echo ranging system comprising transducer means for producing signals having relative phase relations correlative with the direction of incidence thereon of wave energy arriving as a target echo, means responsive to said signals for producing pairs of output voltages having relative amplitudes correlative with the target bearing in azimuth and depth and a pilot signal having an amplitude correlative with the intensity of the wave energy incident on the transducer means, means for amplitude modulating each of said output voltages in progressive 90° phase relation, means for combining the modulated voltages to produce a resultant voltage modulation having quadrature components correlative with the relative amplitudes of said output voltages, converter means for reducing the frequency of the pilot signal, common amplifier means for amplifying the resultant voltage and the reduced frequency pilot signal, phase-sensitive detector means for separating said quadrature components, delayed AVC means for maintaining the average level of the pilot signal output from said amplifier means substantially constant, said AVC means including means responsive to a decrease in amplitude of said pilot signal for speeding up the recovery time of said AVC means to prevent blanking of a target echo which immediately follows a high level reverberation signal.

6. A multiple signal amplifying system comprising means for amplitude modulating each of a plurality of input signals in progressive 90° phase relation, means for combining the modulated signals and for producing a resultant voltage modulation envelope having quadrature components correlative with the relative amplitudes of the input signals, means for detecting each of said quadrature components of said modulation envelope, and means for rendering said detecting means operative to detect one of said quadrature components only during that portion of the envelope cycle in which the average of the other of said quadrature components is zero.

7. A multiple signal amplifying system comprising means responsive to a pair of signals of the same frequency and having relatively varying amplitudes for producing a resultant voltage modulation having symmetrical A.C. quadrature components each having an amplitude correlative with one of said signals, means for obtaining the time integral of said resultant voltage during a portion of the resultant voltage cycle in which the time integral of one quadrature component is zero and the time integral of the other quadrature component is correlative with the amplitude thereof and means for electronically synchronizing the operation of said resultant voltage producing means and said time integrating means.

8. A multiple signal amplifying system comprising means for producing a plurality of phased voltages having progressive 90° phase relation, means for amplitude modulating each of a plurality of incoming signals with said voltages, means for combining the modulated signals and for producing a resultant voltage modulation having symmetrical A.C. quadrature components each of an amplitude correlative with different signals, means for detecting the resultant voltage modulation and for producing a voltage proportional to the time integral thereof, and means including said means for producing phased voltages for rendering said detecting means operative only during the portion of the cycle of the resultant voltage modulation in which the time integral of one quadrature component is zero and the time integral of the other quadrature component is correlative with the amplitude thereof.

9. A four signal transmitting system comprising means for amplitude modulating a first pair of input signals in relatively opposing phase relation and a second pair of input signals in relatively opposing phase relation and in quadrature with the first pair of signals, means combining the four modulated signals to produce a resultant signal modulation having a first component correlative in amplitude with the relative amplitudes of the first pair of signals and a second component correlative in amplitude with the relative amplitudes of the second pair of signals, a pair of means for obtaining the time integral of each said component, a first control means for rendering one of said integrating means operative during that portion of the cycle of said modulation over which the time integral of said first component is zero and the time integral of said second component is proportional to the amplitude of said second component, and a second control means for rendering the other of said integrating means operative during that portion of the cycle of said modulation over which the time interval of said second component is zero and the time integral of the first component is proportional to the amplitude of said first component.

10. The combination of claim 9 wherein said modulating means includes means for producing phased voltages having progressive 90° phase relations, said integrating means including means for detecting positive portions of said modulation, said control means including means individual to said detectors and responsive to said phased voltages for applying suitable blanking pulses to said detectors.

11. An echo ranging system comprising means for transmitting pulses of high frequency energy at spaced transmission times separated by listening intervals, means including a transducer for receiving target echoes of said energy and for producing output signals therefrom correlative with the direction of incidence of said echoes on the transducer, said last mentioned means also producing a pilot signal having amplitude and frequency characteristics correlative with the magnitude and frequency of said echoes, heterodyning means for reducing the frequency of said pilot signal, frequency discriminator means responsive to said reduced-frequency pilot signal for producing an output voltage having amplitude and polarity correlative with the difference between the reduced-frequency pilot signal and the characteristic center frequency of the discriminator, correcting means utilizing the output of said discriminator means to adjust said heterodyning means during a predetermined sampling interval following each transmission pulse to bring reverberation accompanying said pilot signal to a reduced frequency, substantially equal to the characteristic frequency of the discriminator, means responsive to said output signals, means responsive to a predetermined frequency differential between said reduced frequency pilot signal and the characteristic frequency of said discriminator for producing an enabling pulse, means responsive to said enabling pulse for applying said output signals to said output signal responsive means, and means responsive to the reception of a target echo during said sampling interval for disabling said correcting means.

12. An echo ranging system comprising means including means including a transducer for producing steering signals correlative with the direction of incidence of target echoes on the transducer, means responsive to said steering signals, and enabling means controllable by a unipolar enabling signal to apply said steering signals to said signal responsive means, said enabling means including frequency discriminator means for producing a voltage having amplitude and polarity correlative with the difference in frequency of the target echoes and the characteristic center frequency of the discriminator means, Doppler gate means connected to said discriminator means for passing the discriminator output voltage when the latter exceeds a predetermined positive or negative value, and means responsive to the output voltage of said Doppler gate means for producing a unipolar enabling signal in response to a Doppler gate output voltage of either polarity.

13. An echo ranging device comprising means for transmitting pulses of high frequency energy at spaced transmission times separated by listening intervals, means for receiving echoes arising by target reflection of said pulses and for producing pairs of output signals therefrom having relative amplitudes correlative with the target bearing in azimuth and depth, said last mentioned means also producing a pilot signal correlative in amplitude and frequency with said echoes, heterodyning means for changing the frequency of said pilot signal, discriminator means responsive to the changed-frequency pilot signal for producing discriminator output signals correlative with the frequency differential between the changed pilot signal frequency and the characteristic center frequency of the discriminator, correcting means timed by said transmitter means and utilizing the output of said discriminator means to adjust said converter means during a predetermined interval following each transmitted pulse to bring reverberation accompanying said pilot signal to a reduced frequency substantially equal to the center frequency of the discriminator, normally inoperative first amplifier means, means for switching said amplifier means to each signal of said pairs of output signals in time sequence to produce a resultant voltage having amplitude and phase characteristics correlative with target direction, second amplifier means for amplifying said resultant voltage, phase-sensitive detector means responsive to said resultant voltage for producing steering signals correlative with target bearing in azimuth and depth, and means responsive to a predetermined output from said discriminator means for producing an enabling pulse to thereby render said second amplifier means conducting and pass the resultant voltage therethrough.

14. The combination of claim 13 wherein said switching means comprises means for modulating each signal of said pairs of output signals in progressive 90° phase relation, means for combining said modulated signals for producing said resultant voltage, and means for synchronizing said phase-sensitive detector means with said modulating means.

15. The combination of claim 13 including a steering means, search means operable to control said steering means to guide said device in a predetermined search pattern, relay means normally connecting said search means to said steering means, and means responsive to said enabling pulse for disconnecting said search means from said steering means and for applying said steering signals to said steering means.

16. A guidance system for steering a torpedo, comprising means for transmitting search pulses of acoustic energy underwater in a beam pattern, programmed search control means for guiding the torpedo to effect programmed searching of a region which may encompass a target, receiving means having split-lobe characteristics for yielding target signals correlative with target direction, said receiving means further providing an enabling signal in response to an echo having target Doppler frequency greater than a predetermined value, means controlled by said receiver in response to said enabling signal for disabling said programmed search control means and effecting steering toward said target in accordance with said target signals.

17. An echo-ranging system as in claim 12, including heterodyning means for reducing the frequency of signals applied to the discriminator, and correcting means responsive to the discriminator output voltage, during repetitive samplings, to adjust said heterodyning means to bring reverberation accompanying said target echoes to a reduced frequency substantially equal to the center frequency of said discriminator.

18. An echo ranging system comprising: means for transmitting pulses of search energy at spaced transmission times separated by listening intervals; means for receiving target echoes from said pulses and for producing signals therefrom correlative with the direction of incidence of said echoes, said last mentioned means also producing a pilot signal correlative in amplitude and frequency with said echoes; heterodyning means for changing the frequency of said pilot signal; discriminator means responsive to the changed-frequency pilot signal for producing output signals correlative with the frequency differential between the changed-frequency pilot signal and the center frequency of the discriminator; correcting means timed by said pulse transmitting means for utilizing the output of said discriminator means to adjust said hererodyning means during a predetermined sampling interval following each transmitted pulse to bring reverberation accompanying said pilot signal to a changed frequency substantially equal to the center frequency of said discriminator; means responsive to an echo signal received during said sampling interval and having a predetermined amplitude, for disabling said correcting means; and means responsive to a predetermined output signal from said discriminator for applying said steering signals to steering signal responsive means.

19. An echo ranging device as in claim 13, wherein said pilot signal also is amplified by said second amplifier, and including AVC means responsive to the amplified pilot signal for controlling the gain of said second amplifier.

20. The combination of claim 19 including amplitude gate means connected to said second amplifier means for passing said pilot signal to said discriminator means when said pilot signal exceeds said level, and means for disabling said AVC means during said predetermined interval.

References Cited by the Examiner

UNITED STATES PATENTS

| | | | |
|---|---|---|---|
| 1,892,431 | 12/1932 | Hammond | 114—21 |
| 2,382,058 | 8/1945 | Hull | 144—23 |
| 2,409,632 | 10/1946 | King | 144—23 |
| 2,418,156 | 4/1947 | Bollman | 244—14 |
| 2,424,193 | 7/1947 | Rost | 244—14 |
| 2,452,068 | 10/1948 | Peterson | 340—10 |
| 2,524,180 | 10/1950 | Schuck | 340—6 |
| 2,530,035 | 11/1950 | Watt | 340—3 |
| 2,555,121 | 5/1951 | Emslie | 343—7.7 |
| 2,572,116 | 10/1951 | Daly | 114—21 |
| 2,583,531 | 1/1952 | Hathaway | 340—3 |
| 2,590,574 | 3/1952 | Robinson | 244—14 |
| 2,621,243 | 12/1952 | Sunstein. | |
| 2,644,397 | 7/1953 | Katz. | |

BENJAMIN A. BORCHELT, *Primary Examiner.*

NORMAN H. EVANS, CHESTER L. JUSTUS,
*Examiners.*